US008526399B2

(12) United States Patent
Nakamura

(10) Patent No.: US 8,526,399 B2
(45) Date of Patent: Sep. 3, 2013

(54) COMMUNICATIONS DEVICE USED IN CDMA

(75) Inventor: Tadashi Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 593 days.

(21) Appl. No.: 10/924,934

(22) Filed: Aug. 25, 2004

(65) Prior Publication Data
US 2005/0018642 A1 Jan. 27, 2005

Related U.S. Application Data

(63) Continuation of application No. PCT/JP02/01879, filed on Feb. 28, 2002.

(51) Int. Cl.
H04J 3/22 (2006.01)
(52) U.S. Cl.
USPC ............................. 370/335; 370/342; 370/441
(58) Field of Classification Search
USPC .................... 370/335, 342; 375/260, 267
See application file for complete search history.

(56) References Cited

U.S. PATENT DOCUMENTS

| 5,555,268 | A | | 9/1996 | Fattouche et al. | |
|---|---|---|---|---|---|
| 5,781,542 | A | * | 7/1998 | Tanaka et al. | 370/342 |
| 6,034,952 | A | * | 3/2000 | Dohi et al. | 370/335 |
| 6,064,663 | A | * | 5/2000 | Honkasalo et al. | 370/335 |
| 6,320,897 | B1 | | 11/2001 | Fattouche et al. | |
| 6,381,461 | B1 | * | 4/2002 | Besson et al. | 455/450 |
| 6,907,260 | B1 | * | 6/2005 | Tsunehara et al. | 455/522 |
| 7,050,761 | B2 | * | 5/2006 | Hamabe | 455/69 |
| 7,308,015 | B2 | * | 12/2007 | Takano et al. | 375/130 |
| 2003/0112744 | A1 | * | 6/2003 | Baum et al. | 370/206 |
| 2008/0069259 | A1 | * | 3/2008 | Oshima | 375/261 |

FOREIGN PATENT DOCUMENTS

| CA | 2 238 680 | 11/1999 |
|---|---|---|
| EP | 0 980 160 | 2/2000 |
| EP | 1 071 223 | 1/2001 |
| JP | 7-38963 | 2/1995 |
| JP | 8-163085 | 6/1996 |
| JP | 9-312590 | 12/1997 |
| JP | 10-56420 | 2/1998 |
| JP | 10-145282 | 5/1998 |
| JP | 11-234241 | 8/1999 |
| JP | 11-298369 | 10/1999 |
| JP | 2000-183849 | 6/2000 |
| JP | 2001-036969 | 2/2001 |

(Continued)

OTHER PUBLICATIONS

Japanese Patent Office Notice of Rejection Grounds, mailed Mar. 13, 2007 and issued in corresponding Japanese Patent Application No. 2003-572226.

(Continued)

Primary Examiner — Faruk Hamza
Assistant Examiner — Jay P Patel
(74) Attorney, Agent, or Firm — Staas & Halsey LLP

(57) ABSTRACT

A transmitting device of the present invention is used in a CDMA communications system, and comprises: a plurality of spreading units for spreading user data; a managing unit for managing spread codes; a determining unit for determining a number of codes to be multiplexed based on use statuses of the spread codes managed by said managing unit; and a multiplexing unit for multiplexing the user data spread by spreading units a number of which corresponds to the number of codes to be multiplexed.

8 Claims, 22 Drawing Sheets

(56) References Cited

FOREIGN PATENT DOCUMENTS

| JP | 2001-36939 | 9/2001 |
|---|---|---|
| JP | 2001-339458 | 12/2001 |
| WO | WO 01-37506 | 5/2001 |

OTHER PUBLICATIONS

International Preliminary Examination Report dated Nov. 1, 1004.
Search Report for corresponding European Appln. No. 02 70 1651 dated Aug. 9, 2005.
Notice of Rejection Grounds for corresponding Japanese Application No. 2003-572226 dated Aug. 21, 2006.
Office Action issued in corresponding Chinese Patent Application No. 028283627, on Oct. 19, 2007.
Chinese Office Action issued May 15, 2009 in corresponding Chinese Patent Application 028283627.
Japanese Office Action issued Nov. 24, 2009 in corresponding Japanese Patent Application 2007-224018.
Chinese Office Action issued Feb. 12, 2010 in corresponding Chinese Application No. 02828362.7.
Japanese Office Action issued Mar. 16, 2010 in corresponding Japanese Application No. 2007-224018.
European Search Report dated Aug. 4, 2011 in corresponding European Patent Application 10182241.9.
Office Action issued in corresponding Chinese Patent Application No. 028283627 on Apr. 11, 2008.
PCT International Search Report (PCT/ISA/210) mailed May 28, 2002 in corresponding international application No. PCT/JP02/01879 (2 pages).
International Preliminary Examination Report dated Nov. 1, 2004 in corresponding international application No. PCT/JP02/01879 (5 pages).

\* cited by examiner

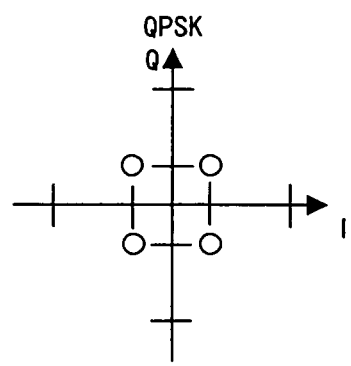
F I G. 1 A
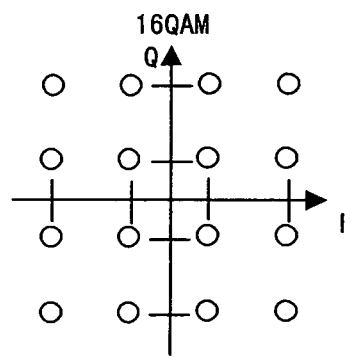
F I G. 1 B
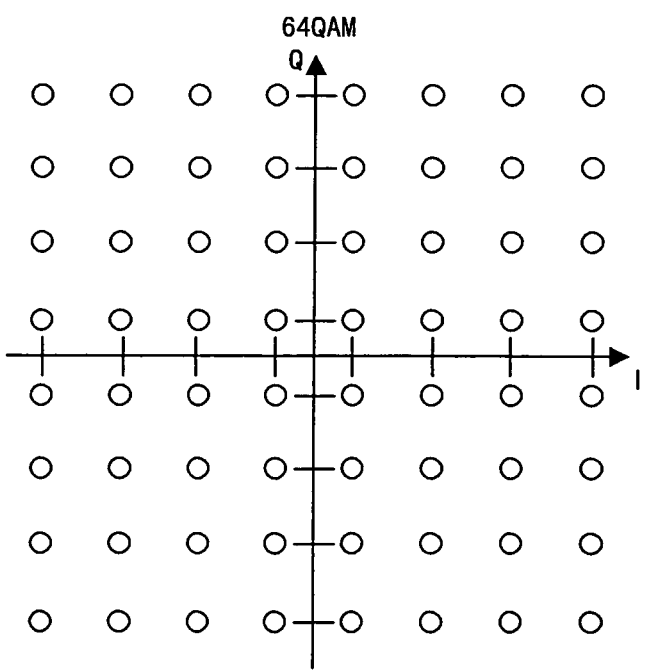
F I G. 1 C

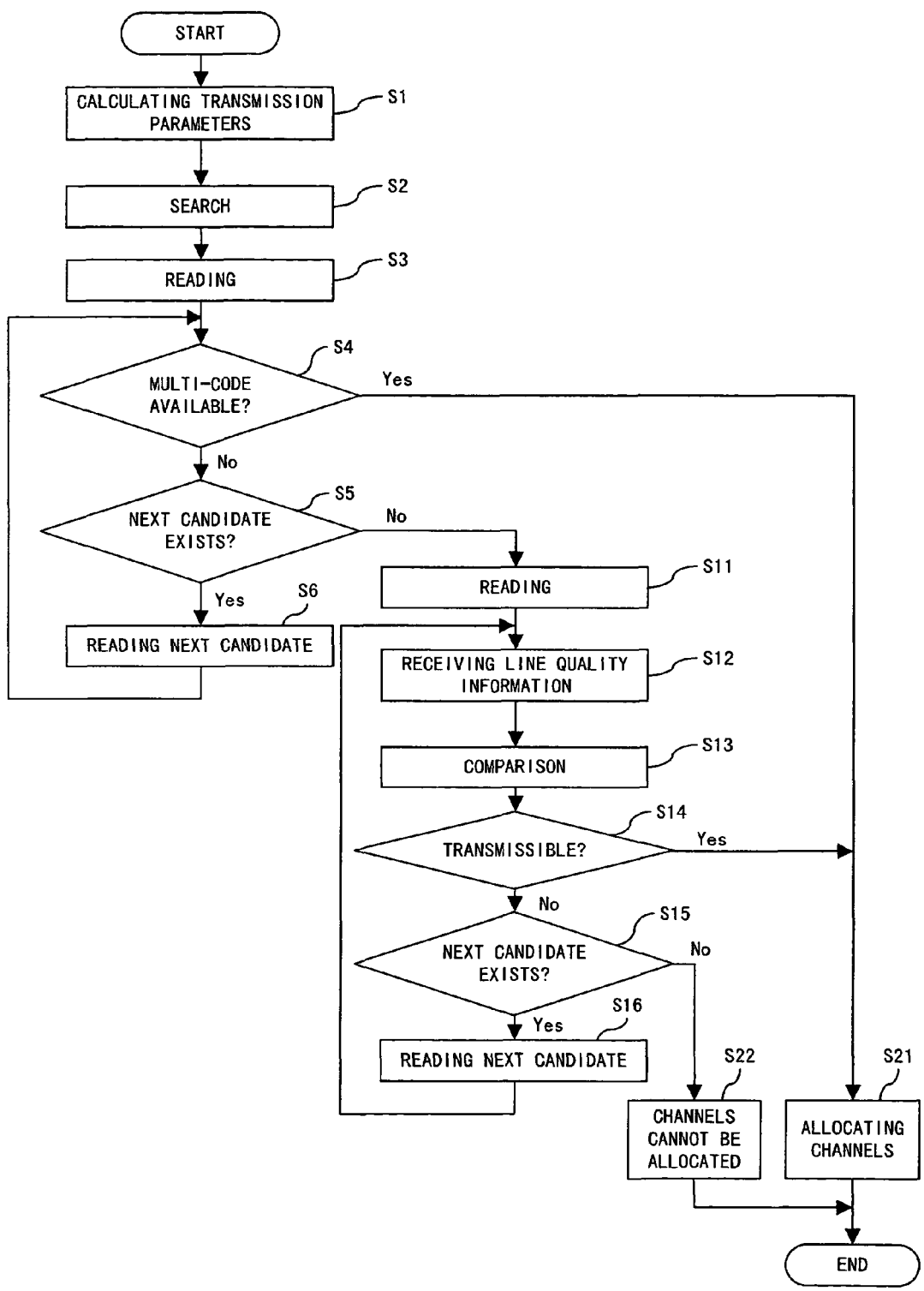
F I G. 8

| SPREAD CODE | STATUS | USER |
|:---:|:---:|:---:|
| CODE 1 | USED | USER A |
| CODE 2 | USED | USER B |
| CODE 3 | UNUSED | — |
| CODE 4 | USED | USER C |
| CODE 5 | USED | USER C |
| CODE 6 | UNUSED | — |
| CODE 7 | UNUSED | — |
| ⋮ | ⋮ | ⋮ |

FIG. 9A

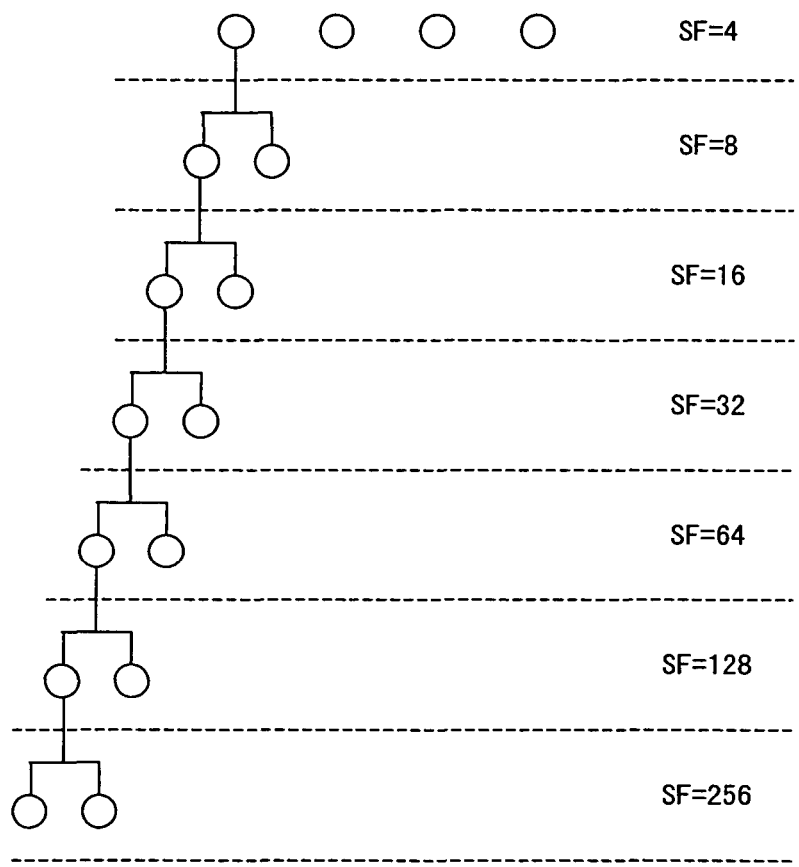
F I G. 9 B

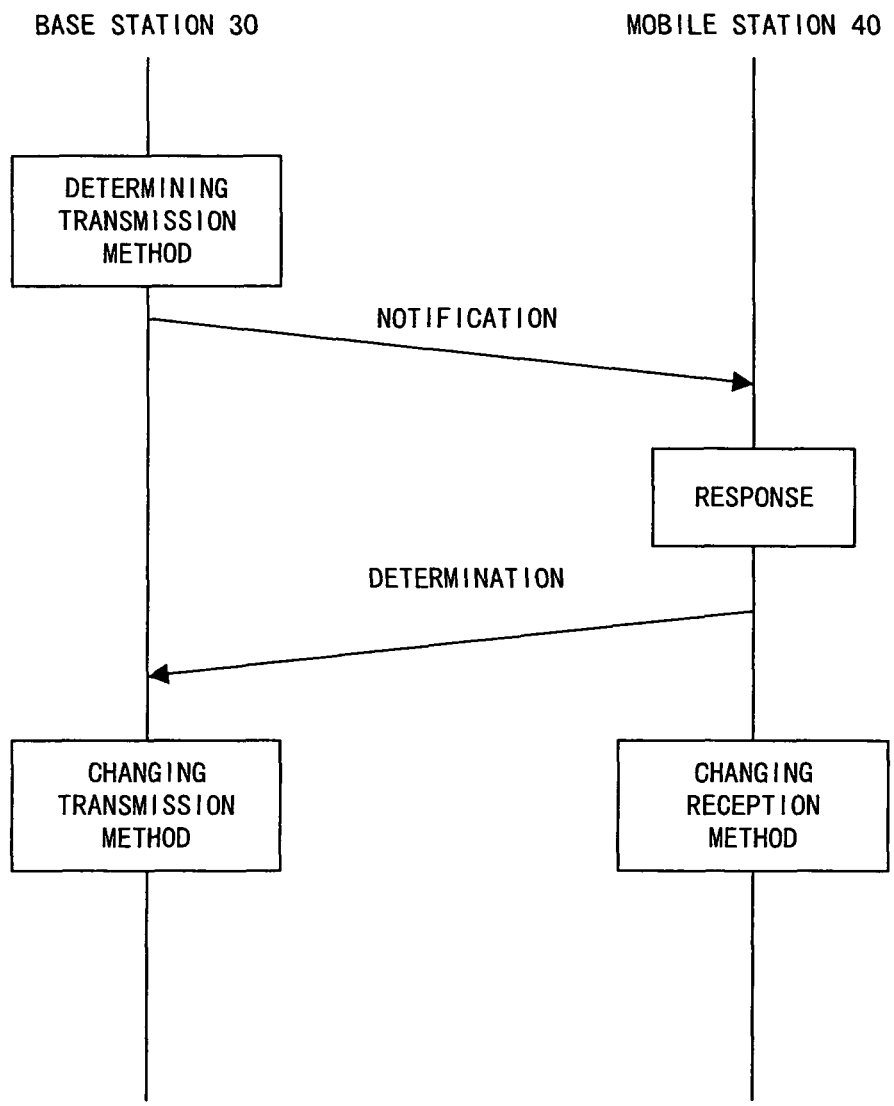
F I G. 1 1

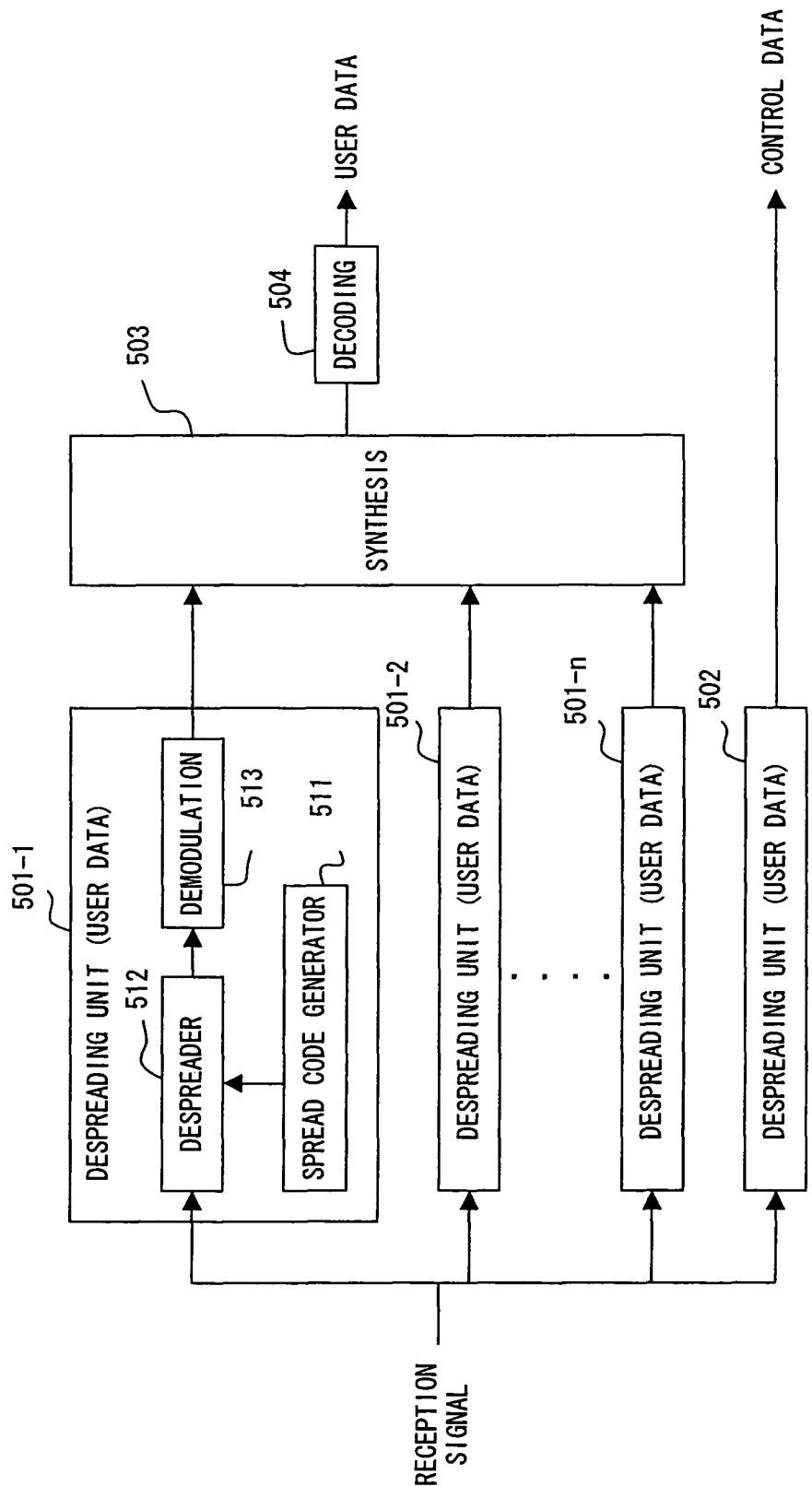
F I G. 12

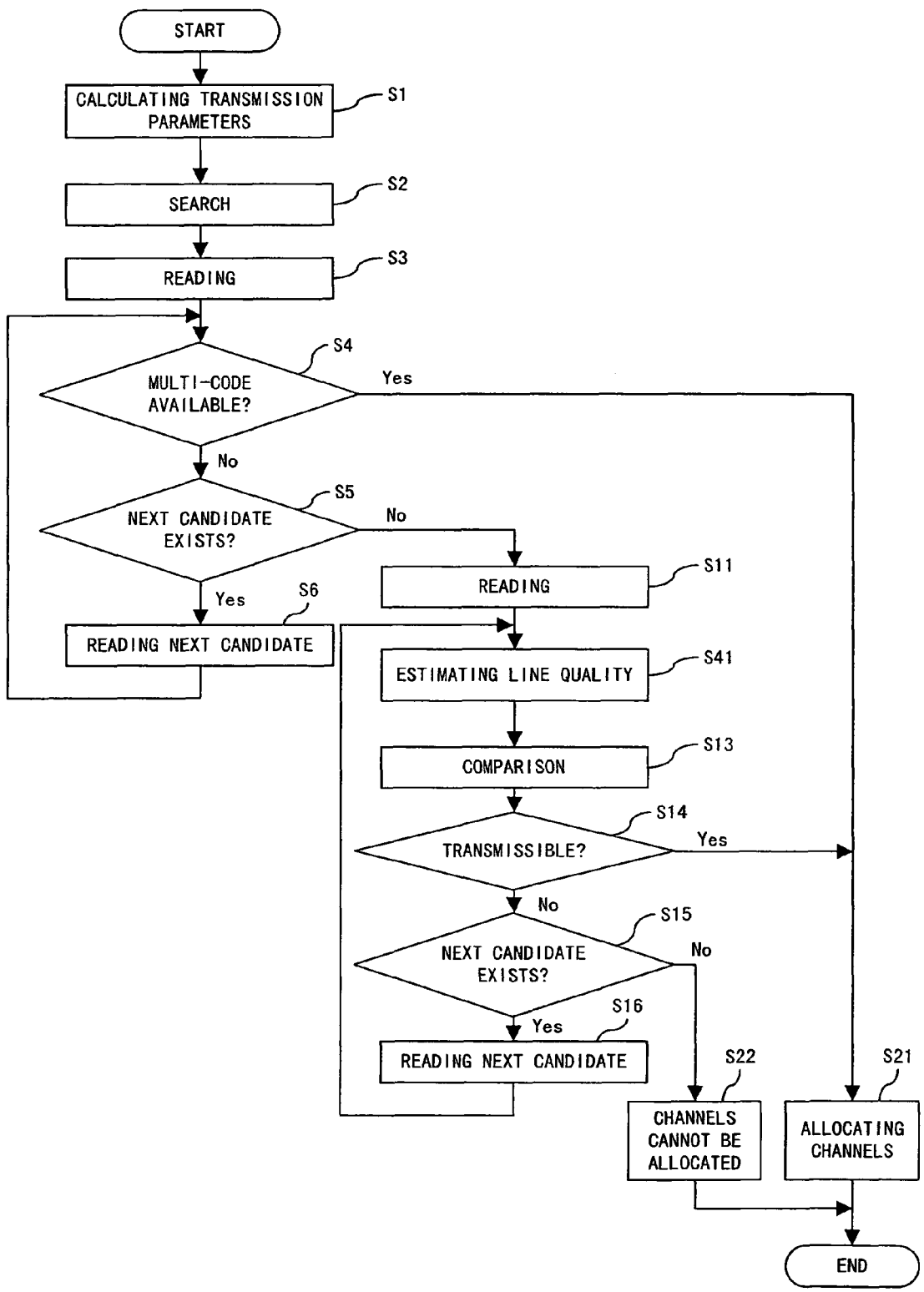
F I G. 1 4

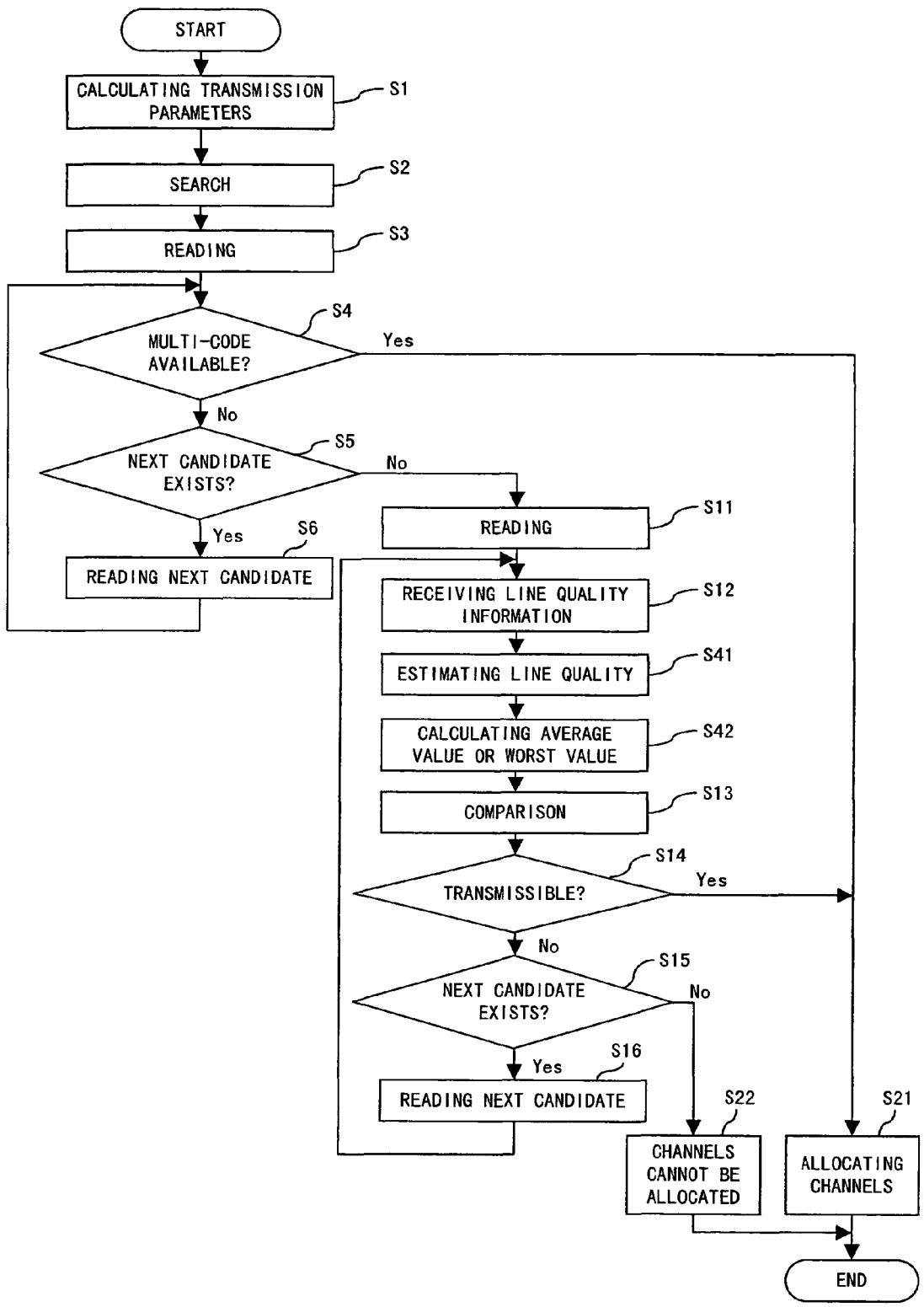
F I G. 1 6

| BEAM NUMBER | SPREAD CODE | STATUS | USER |
|---|---|---|---|
| 1 | CODE 1 | USED | A |
| | CODE 2 | USED | A |
| | CODE 3 | USED | B |
| | CODE 4 | USED | C |
| | ⋮ | | |
| | CODE 256 | UNUSED | — |
| 2 | CODE 1 | USED | P |
| | CODE 2 | UNUSED | — |
| | CODE 3 | USED | Q |
| | CODE 4 | UNUSED | — |
| | ⋮ | | |
| | CODE 256 | USED | R |
| 3 | CODE 1 | USED | X |
| | ⋮ | | |

F I G. 1 9

COMMUNICATIONS DEVICE USED IN CDMA

CROSS REFERENCE

This application is a continuation of PCT application of PCT/JP02/01879, which was filed on Feb. 28, 2002.

BACKGROUND OF THE INVENTION

1. Field of the Invention

The present invention relates to a communications device used in a mobile communications system using CDMA, and more particularly, to a base station device used in a mobile communications system using CDMA.

2. Description of the Related Art

In recent years, development of a digital cellular wireless communications system using CDMA (Code Division Multiple Access) technology, especially, DS-CDMA (Direct Spread-CDMA) technology has been pushed forward as a next-generation mobile communications system implementing a wireless multimedia communication.

In a CDMA communications system, codes are allocated to respective channels or users, and the respective channels or users are identified with the allocated codes in normal cases. Accordingly, a plurality of communications are simultaneously implemented by using the same frequency in a CDMA communications system.

However, if a plurality of communications are simultaneously made, signals of respective channels interfere with one another. As a result, the number of channels (a channel capacity) that can simultaneously make a communication is restricted. Here, interference among signals depends on the transmission powers of the signals. Accordingly, if the quality of communication environment is good, the interference among signals is reduced by decreasing the transmission powers, so that the channel capacity is increased. This technology is sometimes called TPC (Transmitting Power Control), and also has an effect of suppressing the power consumption of a mobile station.

Additionally, a technology for preparing a plurality of modulation methods, and for adaptively selecting a modulation method to be actually used between a base station and a mobile station depending on a communication environment has been studied in recent years. This adaptive modulation technology is described below.

With adaptive modulation in a CDMA communications system, a modulation method is adaptively changed based on a quality (such as a signal-to-interference ratio, an error rate, etc.) of communication environment between a base station and a mobile station in normal cases. As modulation methods, for example, QPSK shown in FIG. 1A, 16QAM shown in FIG. 1B, and 64QAM shown in FIG. 1C are prepared. Here, with QPSK, four signal points are defined on a phase plane, and 2-bit data is transmitted for each symbol. With 16QAM, 16 signal points are defined on a phase plane, and 4-bit data is transmitted for each symbol. With 64QAM, 64 signal points are defined on a phase plane, and 6-bit data is transmitted for each symbol. For example, data is transmitted with QPSK if a communication environment is not good, or data is transmitted with 16QAM or 64QAM if a communication environment is good. In this way, an efficient data transmission is implemented.

FIG. 2 is a block diagram showing an existing transmitting device that can make adaptive modulation. Here, assume that this transmitting device multiplexes user data and control data, and transmits the multiplexed data. Note that this transmitting device is a base station device provided in a mobile communications system.

A data flow rate monitoring unit 1 monitors the data rate of user data to be transmitted. A coding unit (CHCOD) 2 encodes the user data to be transmitted according to a predetermined coding method. A variable rate controlling unit 3 temporarily holds the user data, and outputs the user data at a corresponding rate while referencing a monitoring result of the data flow rate monitoring unit 1. An adaptive modulating unit 4 determines a modulation method based on channel quality information. The channel quality information represents the state of a channel between a base station and a mobile station. For example, a signal-to-interference ratio is used as the channel quality information.

A spreading unit 10 modulates the user data according to the modulation method determined by the adaptive modulating unit 4, and spreads the modulated data. Specifically, a mapping unit 11 arranges the user data at corresponding signal points according to the modulation method determined by the adaptive modulating unit 4. A spread code generator 12 generates a spread code allocated to the user data to be transmitted (or a mobile station receiving the user data). A spreader 13 multiplies the output of the mapping unit 11 by the spread code generated by the spread code generator 12.

A spreading unit 20 spreads control data. Configuration of the spreading unit 20 is fundamentally the same as the spreading unit 10. However, in the spreading unit 20, a spread code predetermined for control data is generated, and the control data is spread with the spread code. Basically, the control data is not adaptively modulated.

A code multiplexing unit 21 multiplexes the output of the spreading unit 10 and the output of the spreading unit 20, and outputs the multiplexed data. A receiving device (a mobile station in this case) receiving the signal transmitted from this transmitting device regenerates user data by using the same spread code as that used in the transmitting device.

An example of the adaptive modulation operations in the above described transmitting device is briefly described. Here, assume that user data is modulated with QPSK, and transmitted. Also assume that channel quality is good.

In this case, the transmitting device can selectively perform the following three operations.

(1) Reducing transmission power without changing a modulation method.
(2) Reducing a symbol rate to 1/2, and changing a modulation method from QPSK to 16QAM. In this case, since the number of bits per symbol is doubled, the data rate remains unchanged. In the meantime, since the symbol rate becomes 1/2, an increase in the transmission power can be consequently suppressed to some extent.
(3) Changing a modulation method from QPSK to 16QAM without changing the symbol rate. In this case, since the number of bits per symbol is doubled, the data rate becomes double. However, the transmission power becomes higher.

In a mobile communications system, an increase in a channel capacity, suppression of the transmission power of a communications device (especially, suppression of the power consumption of a mobile station), and a speedup in the data rate of user data are normally required. These requirements are satisfied by suitably selecting the above described (1) to (3).

With existing techniques, however, these requirements cannot be simultaneously satisfied. Namely, if attempts are made to hold the error rate of a data transmission to be a constant value, distances between signal points arranged on the phase plane shown in FIGS. 1A to 1C must be made constant. In the meantime, the transmission power is proportional to the square of a distance from the origin to a corresponding signal point on the phase plane coordinates, as is well known. Accordingly, if a signal point to be used increases, the transmission power naturally becomes higher. Assuming that distances between signal points are the same, the transmission power of 16QAM becomes higher than that of QPSK by approximately 6 dB, and the transmission power of 64QAM becomes higher than that of QPSK by approximately 12 dB.

As described above, if attempts are made to speed up a data rate with existing adaptive modulation techniques, this increases transmission power or power consumption. Or, if attempts are made to secure constant quality under predetermined transmission power, a data rate cannot be sped up in some cases.

SUMMARY OF THE INVENTION

An object of the present invention is to implement a speedup in the data rate, and suppression of transmission power in a CDMA communications system in a well-balanced manner.

A transmitting device according to the present invention, which is used in a CDMA communications system, comprises: a plurality of modulating/spreading units for modulating and spreading user data; a managing unit for managing spread codes; a determining unit for determining the number of codes to be multiplexed based on the use statuses of the spread codes managed by the managing unit; and a multiplexing unit for multiplexing the user data modulated and spread by modulating/spreading units the number of which corresponds to the number of codes to be multiplexed. This transmitting device is, for example, a base station device in a cellular communications system.

With the above described configuration, a plurality of spread codes are allocated to one user if an extra allocatable spread code exists, whereby user data can be efficiently transmitted by using code multiplexing. Namely, communications resources (spread codes here) can be effectively used.

In the above described transmitting device, a beamformer controlling the directivity of a transmission signal may be further comprised, the managing unit may manage spread codes for each directive beam generated by the beamformer, and the determining unit may determine the number of codes to be multiplexed based on the use statuses of the spread codes managed for each directive beam. With this configuration, the number of mobile stations that can simultaneously make a communication within a communications area increases.

A transmitting device according to another aspect of the present invention, which is used in a CDMA communications system, comprises: a managing unit for managing spread codes; a determining unit for determining whether code multiplexing or adaptive modulation is to be made based on the use statuses of the spread codes managed by the managing unit; and a modulating/spreading unit for processing user data according to a determination made by the determining unit and outputting the processed data.

With this configuration, user data is efficiently transmitted by using code multiplexing if an extra allocatable spread code exists, or user data is transmitted with an optimum modulation method in a communication using one spread code if an extra spread code does not exist.

BRIEF DESCRIPTION OF THE DRAWINGS

FIGS. 1A, 1B, and 1C are schematics respectively showing the arrangements of signal points of QPSK, 16QAM, and 64QAM;

FIG. 8 is a flowchart showing the operations of the base station shown in FIG. 4;

FIG. 9A shows an implementation example of a spread code managing unit;

FIG. 9B exemplifies the structure of spread codes;

FIG. 11 explains a negotiation between the base station and a mobile station;

FIG. 12 is a block diagram showing a mobile station receiving a signal transmitted from the base station shown in FIG. 4;

FIG. 14 is a flowchart showing the operations of the base station according to the second embodiment;

FIG. 16 is a flowchart showing the operations of the base station according to the third embodiment;

FIG. 19 shows an implementation example of a spread code managing unit managing spread codes for each beam;

DESCRIPTION OF THE PREFERRED EMBODIMENTS

Preferred Embodiments according to the present invention are described with reference to the drawings.

Figure 3:
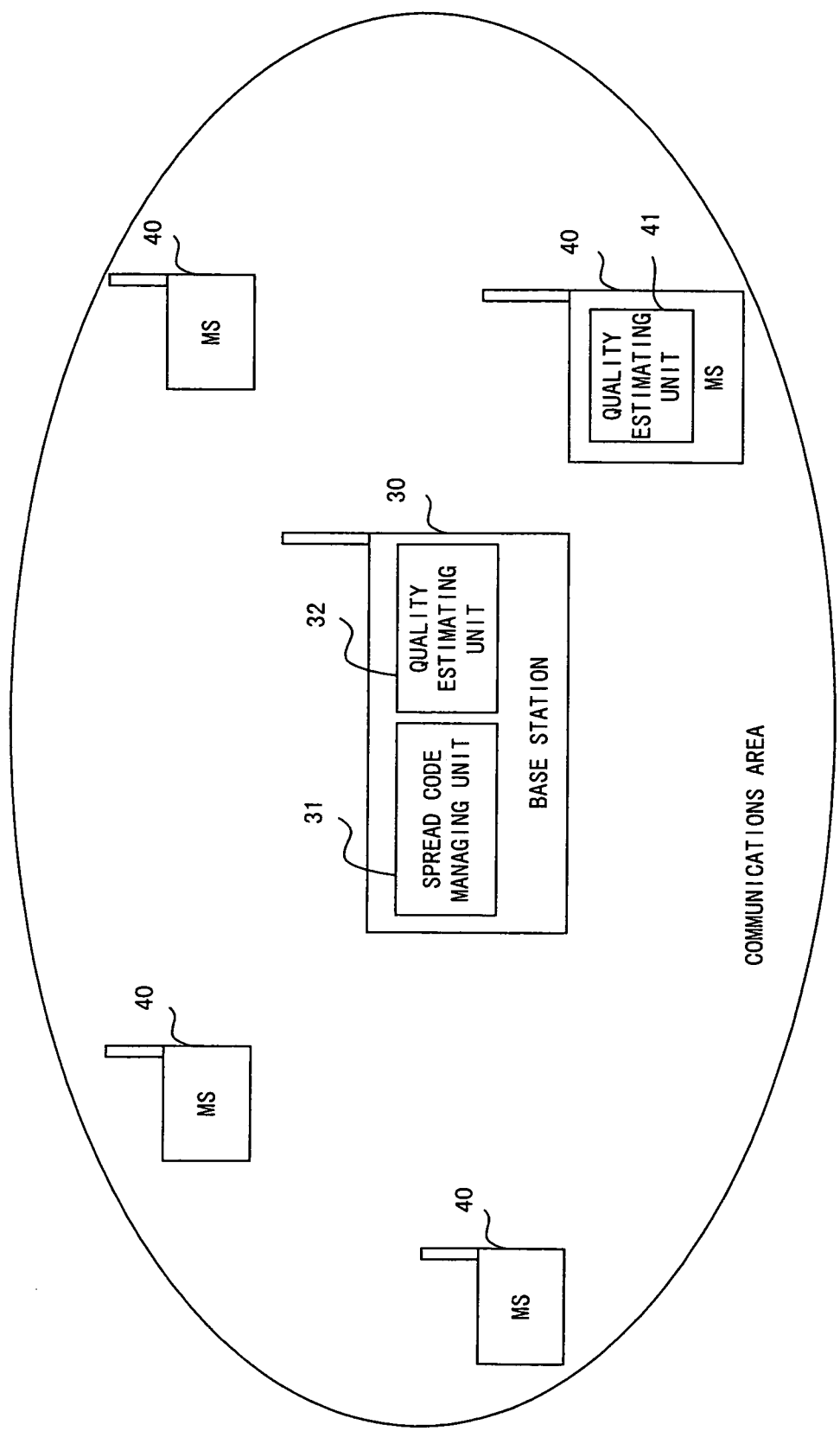
FIG. 3 is a schematic diagram showing a mobile communications system according to an embodiment of the present invention.

FIG. 3 is a schematic diagram showing a mobile communications system according to an embodiment of the present invention. In this figure, a base station 30 comprises a function for transmitting/receiving a wireless signal to/from a mobile station (MS) 40 within a communications area. In the meantime, each of the mobile stations 40 comprises a function for transmitting/receiving a wireless signal to/from the base station 30. When communicating with another terminal device, each of the mobile stations 40 transmits/receives data via the base station 30.

The above described communications system is a CDMA communications system. Here, in the CDMA communications system, codes (spread codes) are allocated to respective channels or users, and the respective channels or users are identified with the allocated spread codes in normal cases. However, in the system according to the embodiment, a plurality of spread codes are adaptively allocated to one user depending on a communication environment in some cases. Also a modulation method for a signal transmitted between the base station 30 and a mobile station 40 is adaptively selected depending on a communication environment.

The base station 30 comprises a spread code managing unit 31, which manages a predetermined number of spread codes used within a communications area. Namely, the spread code managing unit 31 manages spread codes to be allocated to mobile stations 40 that make a communication within a communications area. Accordingly, the spread code managing unit 31 grasps the number of spread codes unused among the predetermined number of spread codes prepared.

The base station 30 further comprises a quality estimating unit 32, which detects or estimates the quality of a channel between the base station 30 and each of the mobile stations 40. Namely, the quality estimating unit 32 receives a signal transmitted from each of the mobile stations 40, and detects or estimates a signal-to-interference ratio (SIR), an error rate, reception power, etc. for each of the mobile stations. Note that a method detecting or estimating the signal-to-interference ratio (SIR), the error rate, the reception power, etc. is a known technique.

In the meantime, each of the mobile stations 40 comprises a quality estimating unit 41 in order to estimate the quality of a channel between the base station 30 and the mobile station 40. The quality estimating unit 41 receives a signal transmitted from the base station 30, and detects or estimates a signal-to-interference ratio (SIR), an error rate, reception power, etc. Channel quality information detected or estimated by the quality estimating unit 41 is notified to the base station 30.

A transmitting device according to the embodiment is described next. The following description refers to a case where data is transmitted from the base station 30 to a corresponding mobile station 40 in the system shown in FIG. 3. Namely, the transmitting device according to the embodiment is assumed to be the base station 30 shown in FIG. 3. However, the present invention is not limited to this implementation, and is also applicable to a case where data is transmitted from a mobile station 40 to the base station 30.

Figure 4:
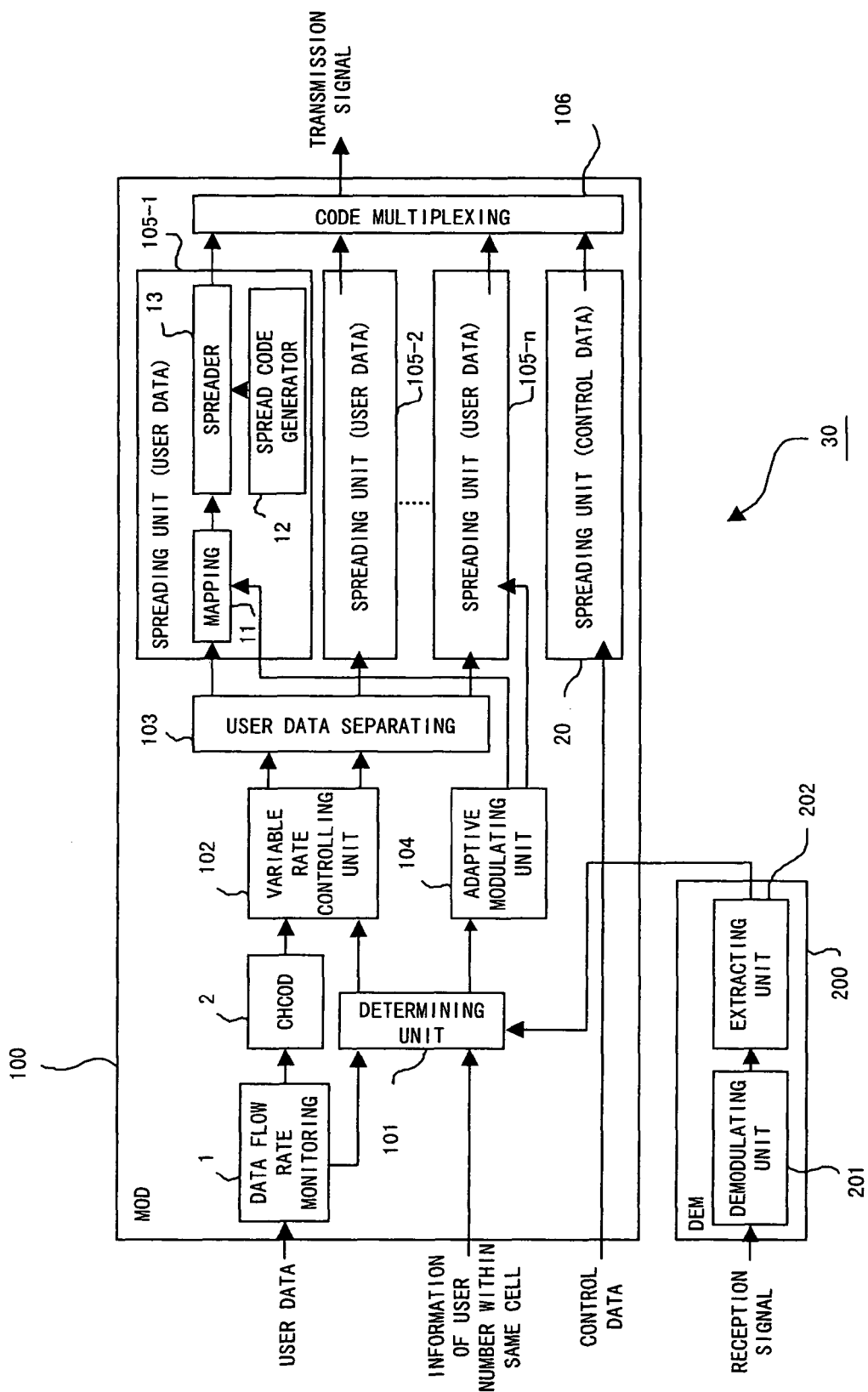
FIG. 4 is a block diagram showing the functions of a base station.

FIG. 4 is a block diagram showing the functions of the base station 30. This figure shows only the functions directly related to the present invention.

The base station 30 comprises a transmitting unit (MOD) 100, and a receiving unit (DEM) 200. Here, the transmitting unit 100 comprises functions for modulating and spreading control data and user data, which are to be transmitted to a corresponding mobile station 40, for multiplexing the control data and the user data, and for transmitting the multiplexed data. In the meantime, the receiving unit 200 comprises a function for regenerating data by demodulating a signal received from a mobile station 40.

A data flow rate monitoring unit 1 monitors the data rate of user data to be transmitted to a corresponding mobile station 40. A coding unit (CHCOD) 2 encodes the user data to be transmitted according to a predetermined coding method. A determining unit 101 determines whether or not to make code multiplexing based on data rate information, user number information, and channel quality information. The data rate information is detected by the data flow rate monitoring unit 1. The user number information is information indicating the number of users who make a communication within a communications cell, or information indicating the number of unused spread codes which are not allocated to any of mobile stations 40, and is provided from the spread code managing unit 31 shown in FIG. 3. The channel quality information is detected or estimated by the quality estimating unit 41 of a corresponding mobile station 40, and received via the receiving unit 200.

A variable rate controlling unit 102 temporarily holds user data, and outputs the user data at a corresponding rate according to an instruction from the determining unit 101. A user data separating unit 103 distributes the user data output from the variable rate controlling unit 102 to one or a plurality of spreading units (105-1 to 105-n) according to an instruction from the determining unit 101. An adaptive modulating unit 104 determines a modulation method based on an instruction from the determining unit 101, data rate information, and channel quality information. The data rate information and the channel quality information are as described above.

Spreading units 105-1 to 105-n respectively comprise a mapping unit 11, a spread code generator 12, and a spreader 13, and respectively modulate and spread provided user data. Namely, the mapping unit 11 arranges the user data at corresponding signal points according to the modulation method determined by the adaptive modulating unit 104. The spread code generator 12 generates a spread code allocated to a corresponding channel or user. The spreader 13 multiplies the output of the mapping unit 11 by the spread code generated by the spread code generator 12. Note that the spreading units 105-1 to 105-n spread the user data by using spread codes different from one another.

Figure 2:
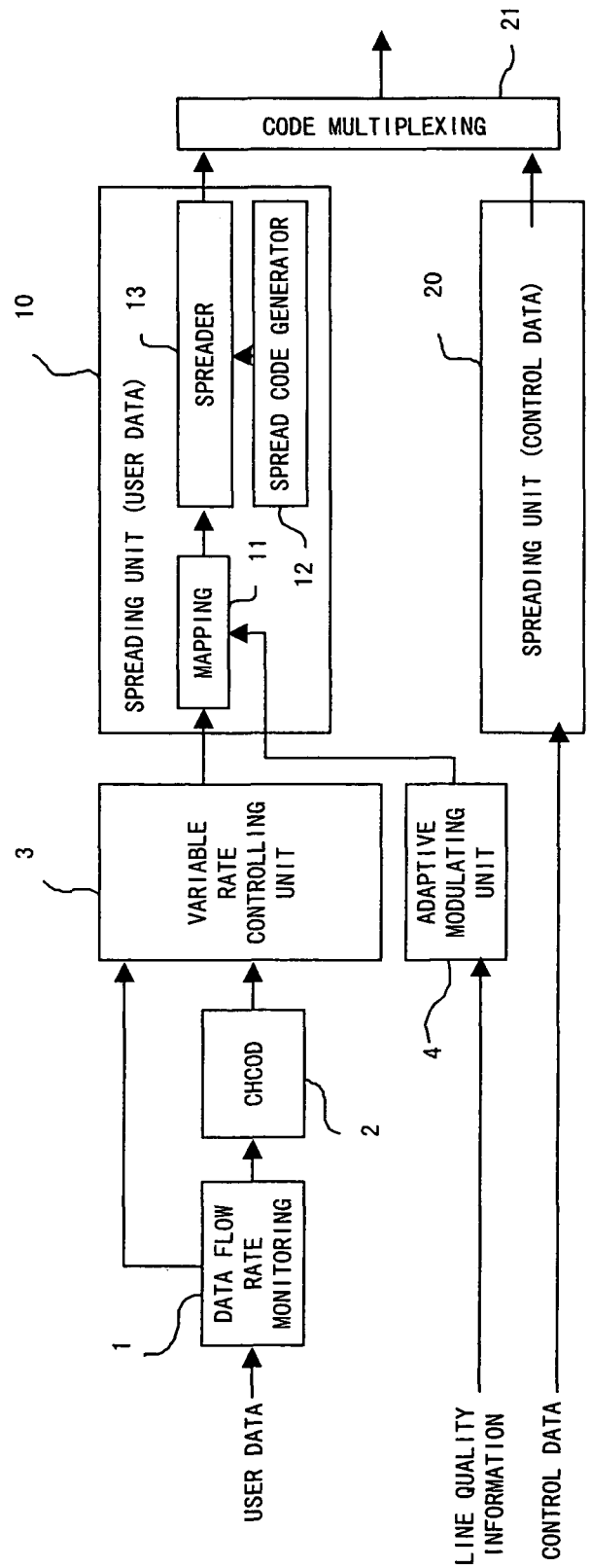
FIG. 2 is a block diagram showing an existing transmitting device that can make adaptive modulation.

A spreading unit 20 spreads control data by using a predetermined spread code as described with reference to FIG. 2. A code multiplexing unit 106 multiplexes the outputs of the spreading units 105-1 to 105-n and the output of the spreading unit 20, and outputs the multiplexed data. A mobile station 40 regenerates the user data and the control data by using the same spread codes as those used in the base station 30.

The receiving unit 200 comprises a demodulating unit 201 and an extracting unit 202. Here, the demodulating unit 201 regenerates data by demodulating a signal transmitted from a mobile station 40. Additionally, the extracting unit 202 extracts channel quality information obtained by the mobile station 40 from the data regenerated by the demodulating unit 201. Then, the channel quality information is passed to the determining unit 101 and the adaptive modulating unit 104.

Figure 5:
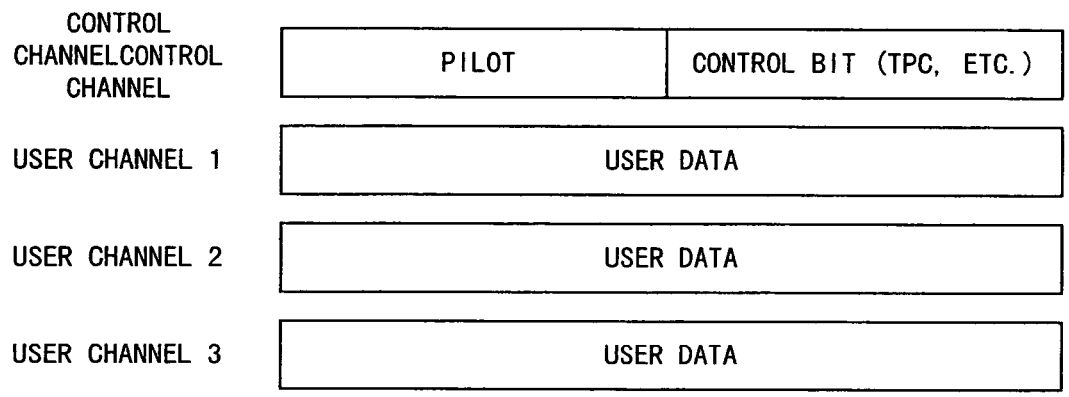
FIG. 5 is a schematic showing the format of data transmitted from the base station shown in FIG. 4.

FIG. 5 is a schematic showing the format of data transmitted from the base station 30 shown in FIG. 4. Here, this figure shows a state where user data is separated into three data strings by the user data separating unit 103.

Control data includes a pilot signal used for channel estimation, etc., and a control bit for various types of controls such as a transmission power control, etc. The control data is modulated and spread by the spreading unit 20. Here, a modulation method is QPSK. Additionally, the spreading unit 20 uses a prefixed "spread code 0" in order to spread the control data.

In the meantime, respective pieces of user data (three data strings output from the user data separating unit 103) are modulated and spread by arbitrary three spreading units among the spreading units 105-1 to 105-n. At this time, the respective pieces of user data are modulated with a modulation method (QPSK, 8PSK, 16QAM, 64QAM, or the like) specified by the adaptive modulating unit 104. Additionally, the respective pieces of user data are spread with spread codes (spread codes 1 to 3 here) dynamically allocated.

These pieces of data are transmitted to a corresponding mobile station 40 via a control channel and user channels 1 to 3, which are identified with the spread codes.

Figure 6:
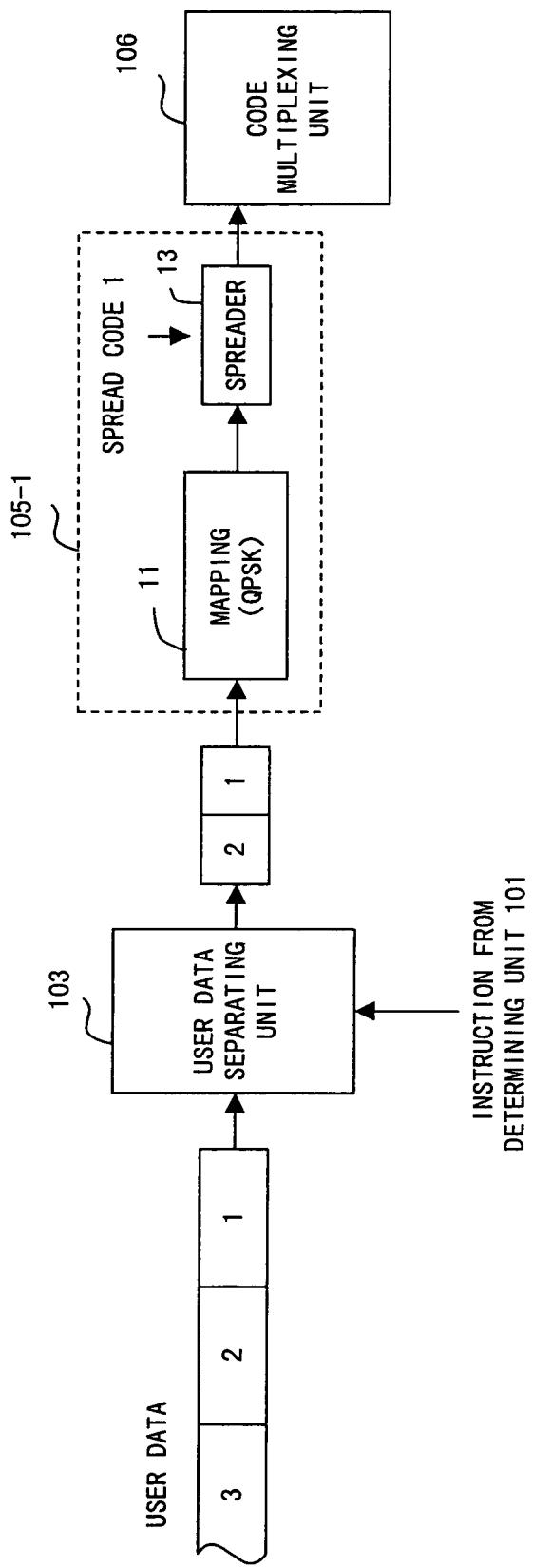
FIGS. 6 and 7 are schematics explaining code multiplexing in the embodiment.
Figure 7:
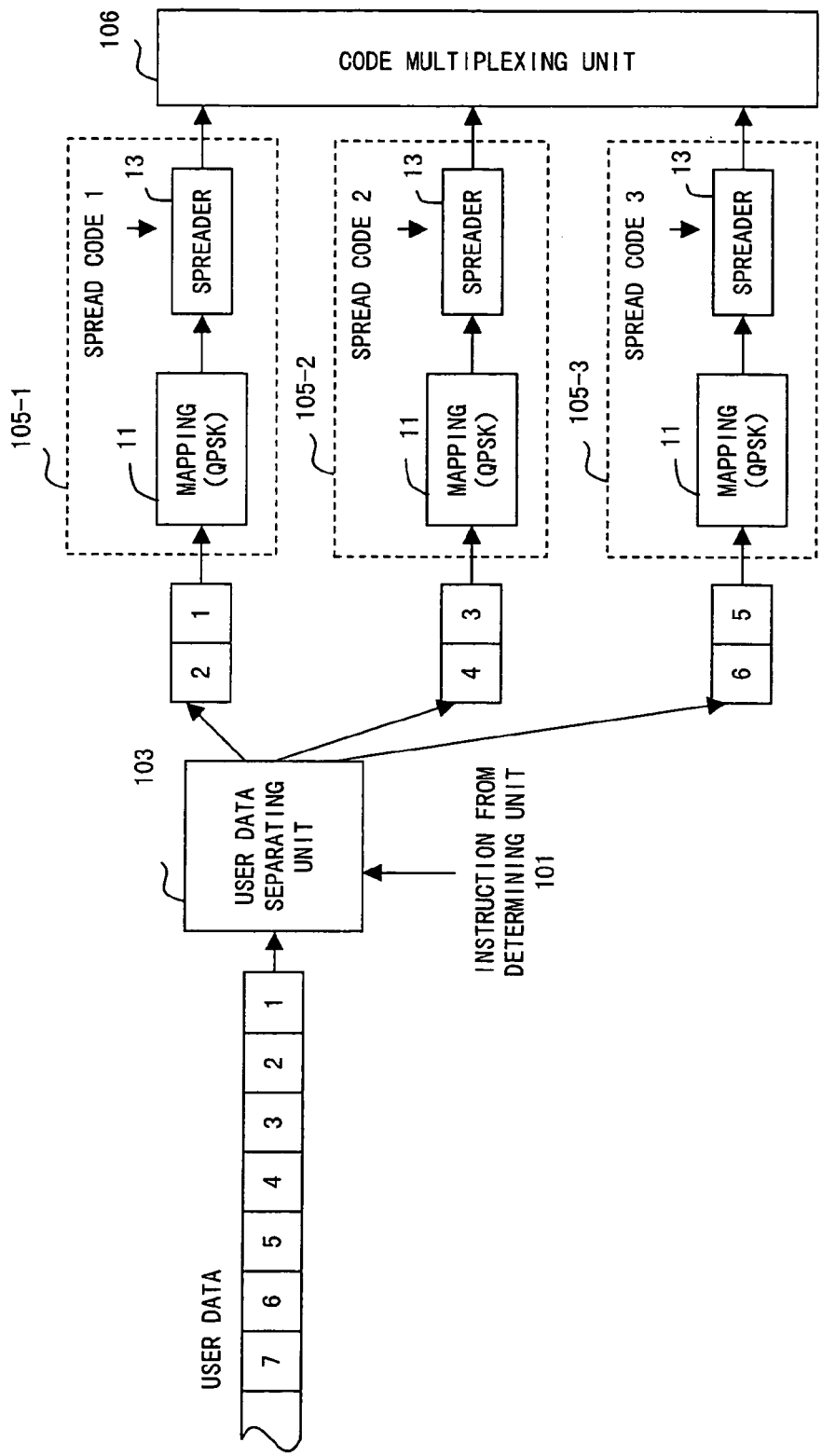

Code multiplexing operations performed in the base station 30 are described next with reference to FIGS. 6 and 7. FIG. 6 shows the flow of data when code multiplexing is not made, whereas FIG. 7 shows the flow of data when code multiplexing is made. FIG. 7 depicts a case where code multiplexing is made with three spread codes.

When code multiplexing is not made, user data is transmitted to the spreading unit 105-1 unchanged without being separated as shown in FIG. 6. Then, the user data is modulated by the mapping unit 11, and spread with the "spread code 1" by the spreader 13. Here, if a modulation method is QPSK, the user data is arranged at corresponding signal points in units of two bits. Namely, 2-bit data is transmitted for each symbol.

In the meantime, when code multiplexing is made, user data is separated into three data strings by the user data separating unit 103 as shown in FIG. 7, and transmitted to the spreading units 105-1 to 105-3. Then, the data strings are respectively modulated by the corresponding mapping unit 11, and spread by the corresponding spreader 13. At this time, the "spread code 1" is used by the spreading unit 105-1, the "spread code 2" is used by the spreading unit 105-2, and the "spread code 3" is used by the spreading unit 105-3. Accordingly, if a modulation method is QPSK, 2-bit data is transmitted for each symbol by the spreading units 105-1 to 105-3. Namely, if code multiplexing is made with the three spread codes, data of a total of six bits is transmitted during 1-symbol time. In other words, if code multiplexing is made with n spread codes based on the assumption that a modulation method and a spread factor (the number of chips per symbol) are the same, a data rate for transmitting user data becomes an n multiple in comparison with the case where code multiplexing is not made.

As described above, making code multiplexing can speed up a data rate for transmitting user data.

A point that transmission power can be suppressed by making code multiplexing is described next. Here, under a condition that data rates are the same, a comparison is made between a case where code multiplexing is made and a case where code multiplexing is not made. A case where 6-bit data is transmitted during a 1-symbol time is assumed as an example.

(1) Case Where Code Multiplexing is not Made

To transmit 6-bit data for each 1 symbol without making code multiplexing, for example, 64QAM is considered to be normal. With 64QAM, 64 signal points on a phase plane are used as shown in FIG. 1C. Here, assuming that the 64 signal points are arranged around the origin as a center, and a minimum distance between signal points is "2", the signal points are arranged at $(+1,+1)$, $(-1,+1)$, $(-1,-1)$, $(+1,-1)$, ... $(+7,+7)$, $(-7,+7)$, $(-7,-7)$, and $(+7,-7)$. Additionally, if a signal is transmitted by using a certain signal point, its transmission power is equivalent to the square of the distance from the origin to the signal point. Accordingly, the average transmission power of 64QAM is calculated as follows.

$$\text{average power} = \{4 \times (1^2+1^2)+8 \times (1^2+3^2)+8 \times (1^2+5^2)+8 \times (1^2+7^2)+8 \times (3^2+5^2)+8 \times (3^2+7^2)+8 \times (5^2+7^2)+4 \times (3^2+3^2)+4 \times (5^2+5^2)+4 \times (7^2+7^2)\}/64=42$$

In this case, the average amplitude results in 6.48.

(2) Case Where Code Multiplexing is Made

Here, assume that 6-bit data is transmitted during a 1-symbol time with the method shown in FIG. 7. Namely, it is assumed that user data is modulated with QPSK by the spreading units 105-1 to 105-3 in units of two bits, and the modulated 2-bit data are multiplexed by the code multiplexing unit 106.

Also assume that signal points are arranged around the origin as a center, and a minimum distance between signal points is "2" with QOSK. In this case, the signal points are arranged at $(+1,+1)$, $(-1,+1)$, $(-1,-1)$, $(+1,-1)$ as shown in FIG. 1A. Additionally, if three QPSK signals modulated by the spreading units 105-1 to 105-3 are multiplexed, I and Q components of the multiplexed signal are obtained by respectively adding the I and the Q components of the three QPSK signals. For example, if all the I and the Q components of the three QPSK signals generated by the spreading units 105-1 to 105-3 are $(+1,+1)$, the signal point of the multiplexed signal results in $(+3,+3)$. Or, if all the I and the Q components of the three QPSK signals are $(-1,-1)$, the signal point of the multiplexed signal results in $(-3,-3)$. Or, if the I and the Q components of the three QPSK signals are respectively $(-1,-1)$, $(+1,-1)$, and $(+1,+1)$, the signal point of the multiplexed signal results in $(+1,-1)$. In this way, added values are calculated for all of combinations. As a result, this multiplexed signal is arranged at 16 signal points configured by $(+1,+1)$, $(-1,+1)$, $(-1,-1)$, $(+1,-1)$, ... $(+3,+3)$, $(-3,+3)$, $(-3,-3)$, and $(+3,-3)$. Namely, the same signal point arrangement as that of 16QAM shown in FIG. 1B is obtained. Accordingly, the average power of the multiplexed signal is calculated as follows.

$$\text{average power} = \{4 \times (1^2+1^2)+8 \times (1^2+3^2)+4 \times (3^2+3^2)\}/16=10$$

In this case, the average amplitude results in 3.16.

Based on the assumption that the data rates are the same, it is proved from the above described (1) and (2) that transmitting data with code multiplexing significantly suppresses transmission power in comparison with the case where code multiplexing is not used. Namely, taking advantage of code multiplexing can reduce power consumption. In the above described example, making a 3-multi-code transmission enables an equivalent error rate to be obtained even if the transmission power is reduced by 6 dB in comparison with 64QAM.

By making code multiplexing as described above, a speedup in a data rate and/or a reduction in power consumption are implemented. Assume that a request to make a high-speed transmission that cannot be implemented unless 64QAM is used is issued from a user to a conventional transmitting device that does not make code multiplexing. In this case, if an electric field intensity that satisfies required Eb/No cannot be obtained with 64QAM, a data transmission is made at a data rate lower than the rate requested by the user, or the data transmission itself is not made. In the meantime, the transmitting device according to this embodiment makes code multiplexing by using a plurality of spread codes, whereby an error rate is improved by approximately 3 dB even if its transmission power is the same as that of a conventional transmitting device. Therefore, the required Eb/No can be satisfied. Namely, the request to make the high-speed transmission can be satisfied.

Incidentally, in code multiplexing, a plurality of spread codes are simultaneously used for one piece of user data as a matter of course. Namely, if code multiplexing is made, a plurality of spread codes must remain unused within a communications area. Accordingly, the base station according to this embodiment adaptively or dynamically determines whether or not to make code multiplexing based on the number of spread codes remaining unused. A data transmission process including a process for determining whether or not to make code multiplexing is described with reference to flowcharts.

FIG. 8 is a flowchart showing the operations of the base station shown in FIG. 4. This flowchart shows only the process related to a data transmission. Additionally, the following process is mainly executed by the determining unit 101 and the adaptive modulating unit 104.

In step S1, transmission parameters are calculated based on the data rate of user data, which is detected by the data flow rate monitoring unit 1, (or based on a transmission rate requested by a user). As the transmission parameters, parameters related to code multiplexing, and parameters related to a modulation method are calculated here.

As the parameters related to the code multiplexing, the number of multi-codes, and a symbol rate are calculated. The number of multi-codes is the number of spread codes to be simultaneously used. In the meantime, the symbol rate represents the number of symbols to be transmitted per unit time for each spread code. Here, assuming that a chip rate is constant, the symbol rate is uniquely determined for a spread factor (SF). Accordingly, as the parameters related to the code multiplexing, the number of multi-codes, and the spread factor may be calculated.

The parameters related to the code multiplexing are determined so that a data rate requested by a user is satisfied. Specifically, parameters that satisfy the following condition are selected.

requested data rate≦(the number of bits per symbol)× (symbol rate)×(the number of multi-codes)

Here, assuming that QPSK is used by the spreading units 105-1 to 105-n when code multiplexing is made, the number of bits per symbol is equal to "2". Additionally, assuming that the maximum value of spread codes that can be allocated to each user is n (n=natural number), 1 to n can be selected as the number of multi-codes. However, "the number of multi-codes=1" means that code multiplexing is not made. Furthermore, as the symbol rate, a value corresponding to a spread factor that is suitably selected from among a plurality of predetermined spread factors is used.

Then, a combination of a symbol rate and the number of multi-codes, which satisfy the above described condition, is selected as a candidate parameter. If a plurality of candidate parameters exist, a candidate parameter having a larger number of multi-codes is assumed to have a higher priority.

In the meantime, as the parameters related to a modulation method, a multi-value number and a symbol rate are calculated. The multi-value number normally means the number of signal points arranged on a phase plane. However, the multi-value number means the number of bits per symbol here. Namely, for example, QPSK, 8PSK, 16QAM, and 64QAM are respectively assumed to be "2", "3", "4", and "6".

As the parameters related to a modulation method, parameters that satisfy the following condition are selected.

requested data rate≦(multi-value number)×(symbol rate)

Then, a combination of a "multi-value number" and a "symbol rate", which satisfy the above described condition, is selected as a candidate parameter. If a plurality of candidate parameters exist, a candidate parameter having a larger multi-value number is assumed to have a higher priority.

As described above, in step S1, a candidate of the transmission parameters related to the code multiplexing, and a candidate of the transmission parameters related to a modulation method are respectively selected.

In step S2, the spread code managing unit 31 shown in FIG. 3 is referenced, and an unused spread code is searched. The spread code managing unit 31 manages the use status (used/unused) of each of a predetermined number of prepared spread codes as shown in FIG. 9A. Additionally, spread codes are represented by a tree structure shown in FIG. 9B (or a hierarchical structure) In this example, 256 spread codes are prepared.

In steps S3 to S6, it is determined whether or not code multiplexing can be made. Specifically, a comparison is made between the "number of multi-codes" obtained in step S1, and the "number of available spread codes" detected in step S2. If the "number of available spread codes" is equal to or larger than the "number of multi-codes" at the time, it is recognized that corresponding code multiplexing can be made, and the flow goes to step S21. Then, in step S21, corresponding user channels are allocated. If a plurality of candidates are selected in step S1, the "number of multi-codes", which is the largest within a range of the "number of available spread codes", is selected.

If it is determined that code multiplexing cannot be made (for example, if a higher-level code is used in a system using a hierarchical orthogonal code), an optimum modulation method is determined in steps S11 to S16. At this time, the quality of a channel between the base station 30 and a corresponding mobile station 40 is examined, and a modulation method available under such a communication environment is determined. If a plurality of available modulation methods exist, the modulation method having the highest priority is selected. Note that information indicating the quality of a channel is received from the quality estimating unit 41 of the corresponding mobile station 40 in step S12 in this embodiment.

If it is determined that a modulation method available under the detected communication environment does not exist, it is recognized that a user channel for transmitting the received user data cannot be allocated, and this information is notified to the user in step S22.

In the channel allocation made in step S21, the following processes are executed.
(1) When Code Multiplexing is Made The determining unit 101 notifies the user data separating unit 103 of the "number of multi-codes". For example, if the "number of multi-codes is three" at this time, the user data separating unit 103 separates the received user data into three data strings as shown in FIG. 7. Then, the three data strings are passed to the spreading units 105-1 to 105-3.

Additionally, the adaptive modulating unit 104 notifies that "modulation method is QPSK" to the spreading units 105-1 to 105-n. Based on this notification, the spreading units 105-1 to 105-n respectively modulate the user data with QPSK.

Furthermore, the determining unit 101 notifies the spreading units 105-1 to 105-n, which process the user data, of spread codes different from one another. Here, these spread codes are allocated, for example, by the spread code managing unit 31. The spreading units 105-1 to 105-n, to which the spread codes are respectively allocated, spread the user data with the codes respectively allocated.

In this way, after user data is respectively modulated with QPSK by the plurality of spreading units 105-1 to 105-n, and spread with spread codes different from one another, the spread data are multiplexed.
(2) When Code Multiplexing is not Made The determining unit 101 notifies that "the number of multi-codes=1" to the user data separating unit 103. In this case, the user data separating unit 103 passes the received user data to the spreading unit 105-1 unchanged.

The adaptive modulating unit 104 notifies the spreading unit 105-1 of the modulation method (QPSK, 8PSK, 16QAM, 64QAM, or the like) that is adaptively determined according to the quality of a channel. Then, the spreading unit 105-1 modulates the user data with the notified modulation method.

As described above, in the data transmission represented by the flowchart shown in FIG. 8, whether or not to be able to make code multiplexing is determined according to the use statuses of spread codes (or the number of users who make a communication within a communications area), and a modulation method is determined according to the quality of a channel. In this way, user data is transmitted with a suitable method depending on a communication environment, whereby a speedup in a data rate and/or a reduction in power consumption are implemented. However, the present invention is not limited to this implementation. Whether or not to make code multiplexing may be determined based on both the use statuses of spread codes and the quality of a channel.

Figure 10:
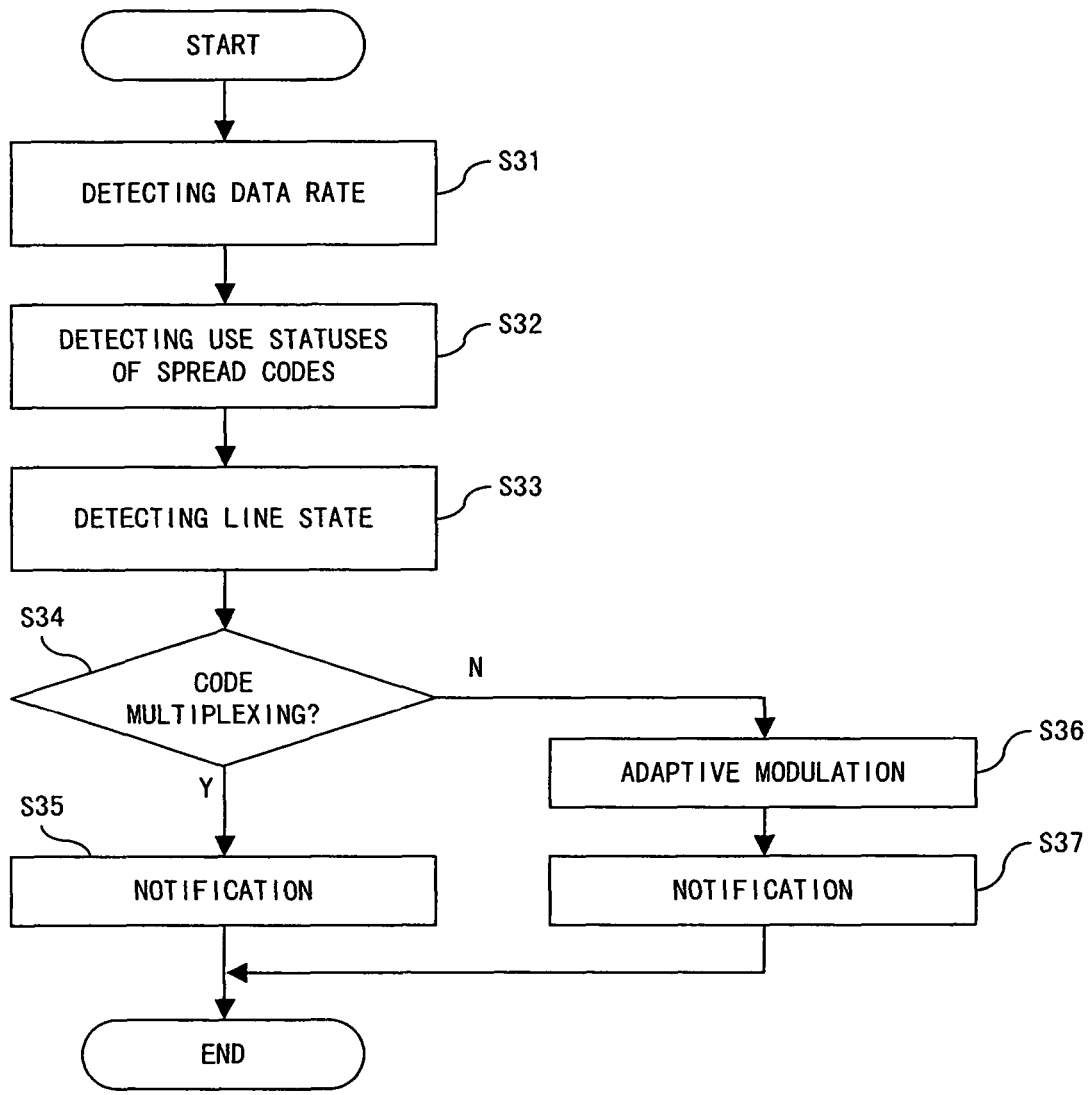
FIG. 10 is a flowchart showing a process for determining whether or not to make code multiplexing based on a data rate, the use statuses of spread codes, and channel quality.

FIG. 10 is a flowchart showing a process for determining whether or not to make code multiplexing based on the data rate, use statuses of spread codes, and the quality of a channel. In step 31, the data rate of user data is detected. In step S32, the use statuses of spread codes are detected. In step S33, the state of a channel is detected. Then, instep S34, whether or not to make code multiplexing is determined. Specifically, for example, the "number of multi-codes" and a "symbol rate (or a spread factor)", which satisfy a data rate requested by a user, are calculated. Then, unused spread codes are searched to examine whether or not to be able to allocate the calculated number of spread codes. Additionally, it is examined in consideration of the state of a channel whether or not to be able to secure predetermined quality when a data transmission is made with the calculated "number of multi-codes" and "symbol rate". If it is consequently determined that the required number of allocatable spread codes are left, and the predetermined quality can be secured, settings for making the code multiplexing are made in step S35.

On the other hand, if code multiplexing is not made, a modulation method is determined in step S36, and a corresponding notification is made in step S37.

The above described embodiment assumes that user data is modulated with QPSK by the spreading units 105-1 to 105-n if code multiplexing is made. However, the present invention is not limited to this implementation. Namely, user data may be modulated with a method other than QPSK by the spreading units 105-1 to 105-n even if code multiplexing is made.

As described above, the base station 30 adaptively changes a data transmission method depending on a communication environment, etc. At this time, a change in the data transmission method is notified to a corresponding mobile station 40 as shown in FIG. 11. Namely, upon determination of a transmission method, the base station 30 notifies a mobile station 40 of the corresponding parameters (the number of multicodes, a spread code, a modulation method, etc.). The mobile station 40 determines whether or not it is able to receive the signal transmitted with the transmission method notified from the base station 30, and makes a response with its result to the base station 30. If the mobile station 40 can receive the data, the base station 30 changes its transmission method. In the meantime, the mobile station 40 changes its reception method.

As described above, a change in a data transmission method is made with a negotiation between the base station 30 and a mobile station 40.

FIG. 12 is a block diagram showing a mobile station receiving a signal transmitted from the base station shown in FIG. 4. Here, only a principal portion of functions directly related to data reception is shown.

A signal transmitted from the base station 30 is received via an antenna, and passed to despreading units 501-1 to 501-n, and 502. Here, the despreading units 501-1 to 501-n despread and demodulate the reception signal. In the meantime, the despreading unit 502 regenerates control data by despreading and demodulating the reception signal.

Configurations of the despreading units 501-1 to 501-n and 502 are fundamentally the same. Namely, a spread code generator 511 generates a predetermined spread code, or a spread code allocated by the base station 30. A despreader 512 multiplies the reception signal by the spread code generated by the spread code generator 511. A demodulator 513 demodulates the despread signal. A combining unit 503 combines the demodulated signals output from the despreading units 501-1 to 501-n. Then, a decoder 504 decodes the output of the combining unit 503, and outputs the decoded data as user data. In the meantime, the demodulated data output from the despreading unit 502 is output as control data.

In the above described mobile station, a demodulation method used by the demodulator 513 complies with an instruction from the base station 30. Additionally, if code multiplexing is made with "k" spread codes, the combining unit 503 regenerates user data by combining the demodulated signals output from despreading units 501-1 to 501-k.

Other embodiments (second to sixth embodiments) according to the present invention are described next.

Figure 13:
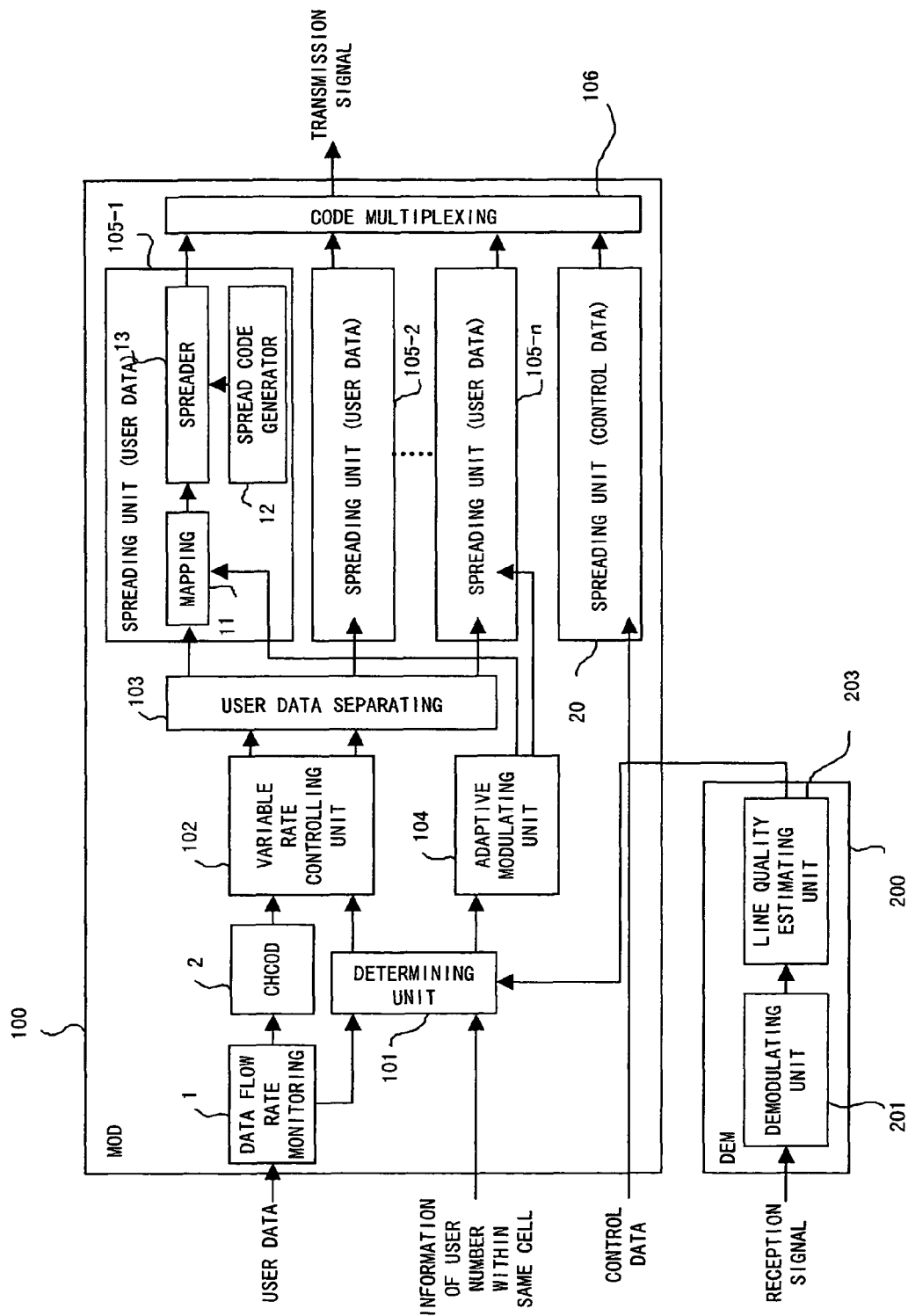
FIG. 13 is a schematic diagram showing the configuration of a base station according to a second embodiment of the present invention.

FIG. 13 is a schematic diagram showing the configuration of a base station according to a second embodiment of the present invention. In the base station according to the second embodiment, the quality of a channel between a mobile station 40 and the base station is detected or estimated in the base station. Namely, a receiving unit (DEM) 200 of the base station comprises a channel quality estimating unit 203 detecting or estimating the quality of a channel between the mobile station 40 and the base station. Here, the channel quality estimating unit 203 receives a signal transmitted from a corresponding mobile station 40, and detects or estimates a signal-to-interference ratio (SIR), an error rate, reception power, etc. A method detecting or estimating the signal-to-interference ratio (SIR), the error rate, the reception power, etc. is a known technique.

Operations of a transmitting unit (MOD) 100 are fundamentally the same as those described with reference to FIG. 4. Namely, a determining unit 101 determines whether or not to make code multiplexing based on channel quality detected or estimated by the channel quality estimating unit 203, and an adaptive modulating unit 104 determines a modulation method based on the channel quality.

FIG. 14 is a flowchart showing the operations of the base station according to the second embodiment. The operations of the base station according to the second embodiment are implemented by replacing step S12 shown in FIG. 8 with step S41. Namely, channel quality information is received from a corresponding mobile station 40 in the flowchart shown in FIG. 8, whereas channel quality information is detected or estimated by the base station in the second embodiment.

Figure 15:
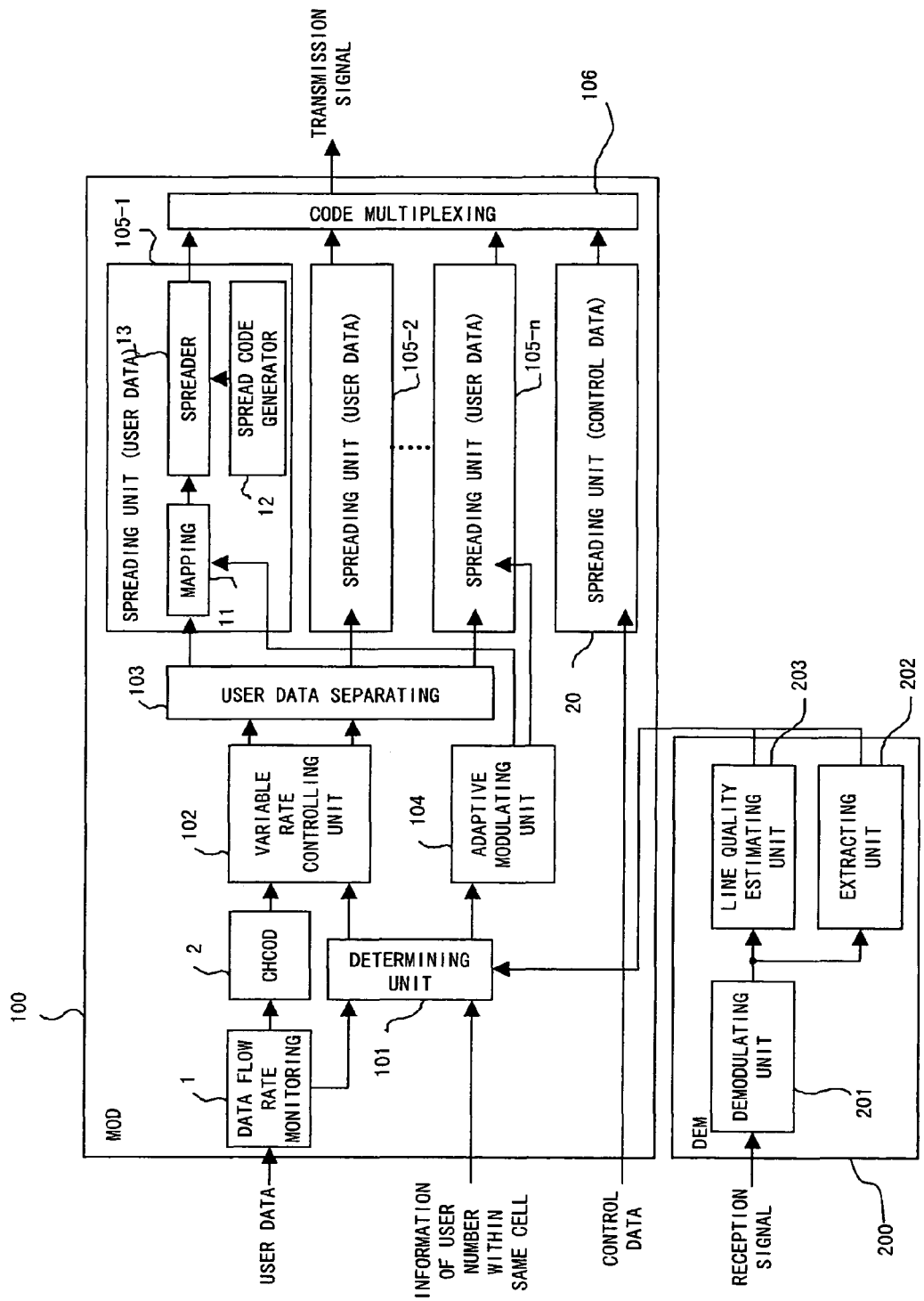
FIG. 15 is a schematic diagram showing the configuration of a base station according to a third embodiment of the present invention.

FIG. 15 is a schematic diagram showing the configuration of a base station according to a third embodiment of the present invention. In the base station according to the third embodiment, the quality of a channel between a mobile station 40 and the base station is estimated in consideration of both a value detected by the mobile station 40 and a value detected by the base station. Namely, a receiving unit (DEM) 200 of this base station comprises both the above described extracting unit 202 and the channel quality estimating unit 203. Then, the average value of these values, or the worse value of these values is transmitted to the determining unit 101 and the adaptive modulating unit. 104 as channel quality information.

The quality of a forward channel transmitting a signal from the base station 30 to a mobile station 40, and the quality of a reverse channel transmitting a signal from the mobile station 40 to the base station 30 are usually the same. However, if the carrier frequencies of the forward and the reverse channels significantly differ, the qualities of these channels may differ from each other. With the base station according to the third embodiment, an optimum data transmission method can be selected in consideration of the qualities of forward and reverse channels even if the qualities are different from each other.

FIG. 16 is a flowchart showing the operations of the base station according to the third embodiment. The operations of the base station according to the third embodiment are implemented by inserting steps S41 and S42 after step S12 shown in FIG. 8. Namely, average quality or the worst quality is obtained from channel quality detected by a mobile station 40 and channel quality detected by the base station. Then, in step S13, whether or not a modulation method attempted to be executed is suitable is determined based on the quality obtained in step S42.

Figure 17:
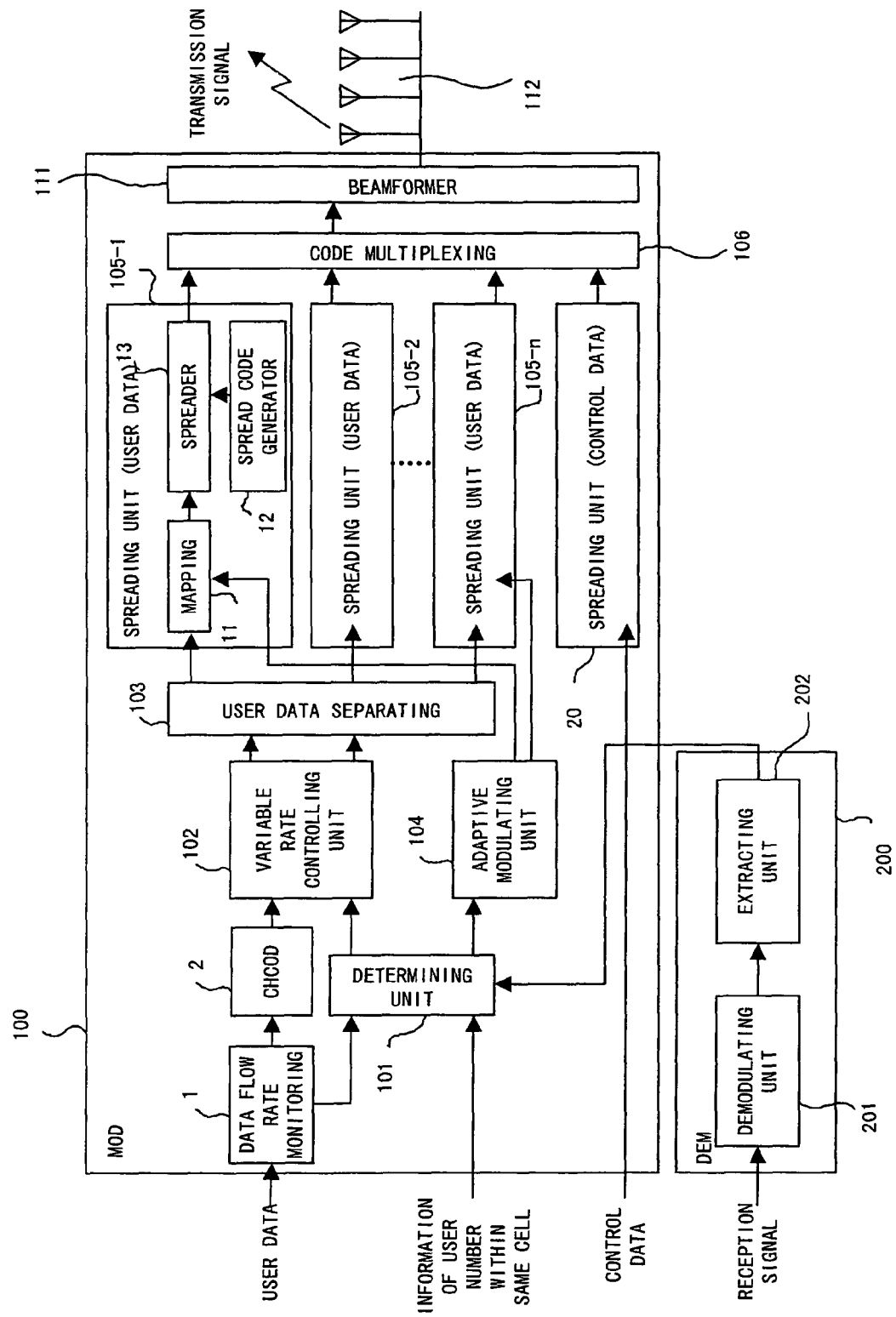
FIG. 17 is a schematic diagram showing the configuration of a base station according to a fourth embodiment of the present invention.
Figure 18:
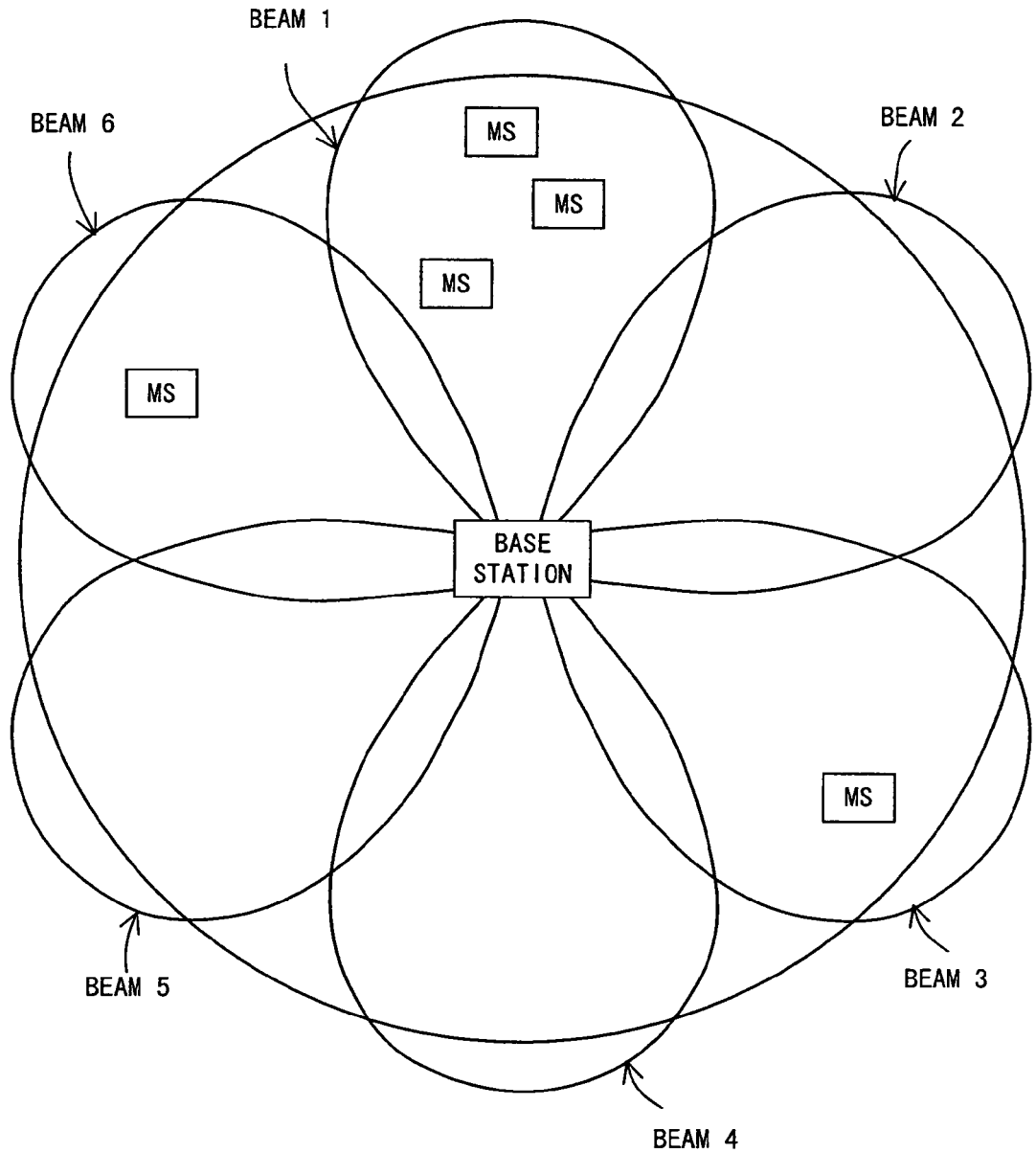
FIG. 18 shows directive beams using an adaptive array.

FIG. 17 is a schematic diagram showing the configuration of a base station according to a fourth embodiment of the present invention. The base station according to the fourth embodiment comprises a beamformer 111 and adaptive array antennas 112 in addition to the configuration shown in FIG. 4, and can make user separation within a communications area. Namely, this base station can transmit wireless signals by using beams having directivity as shown in FIG. 18. If the beams do not overlap one another, or if overlapping of the beams is slight, users within a communications cell are separated respectively with the beams. Namely, even if identical spread codes are allocated to a plurality of users, the base station 30 can identify the users if the spread codes are used within beams different from one another. However, identical spread codes are not permitted to be allocated to a plurality of users within one beam.

The base station according to the fourth embodiment manages the use statuses of spread codes or the number of users for each beam, and determines whether or not to be able to make code multiplexing based on the use statuses or the number of users. Accordingly, the spread code managing unit 31 manages the allocation statuses of spread codes for each of beams as shown in FIG. 19. A correspondence between each mobile station and a beam is assumed to be managed by a known technique.

Additionally, in the base station according to the fourth embodiment, the determining unit 101 references the spread code managing unit 31, and examines the number of available spread codes in a beam corresponding to the position of a mobile station 40, when determining whether or not to make the code multiplexing in a data transmission to the mobile station 40. When the number of spread codes required to make code multiplexing can be secured, the determining unit 101 notifies the user data separating unit 103, the adaptive modulating unit 104, and the spreading units 105-1 to 105-n of parameters for making the code multiplexing. In this way, a multi-code transmission is implemented.

Figure 20:
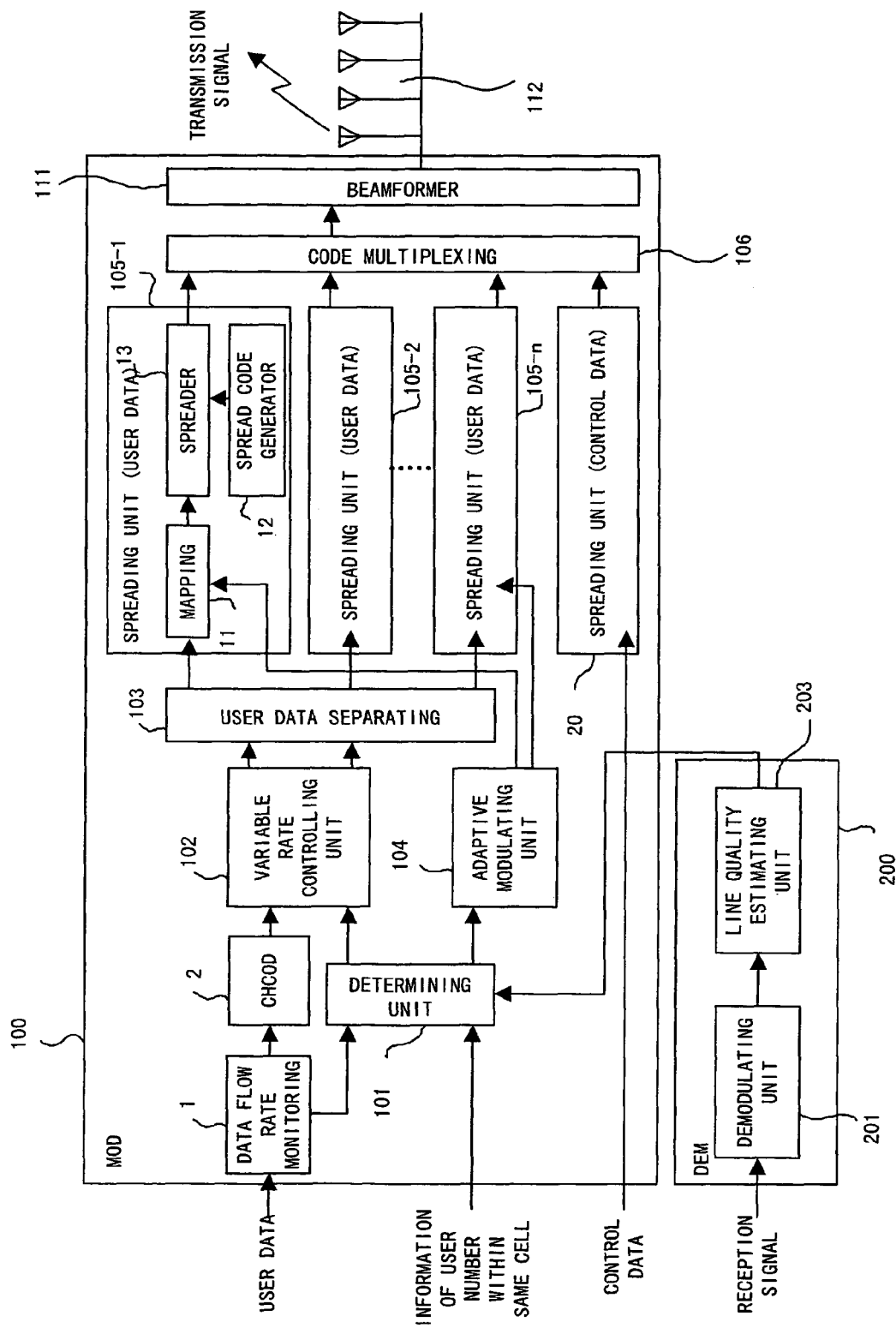
FIG. 20 is a schematic diagram showing the configuration of a base station according to a fifth embodiment of the present invention.

FIG. 20 is a schematic diagram showing the configuration of a base station according to a fifth embodiment of the present invention. The base station according to the fifth embodiment is a combination of the fourth and the second embodiments. Namely, the base station according to the fifth embodiment comprises a function (channel quality estimating unit 203) for detecting the quality of a channel between a mobile station 40 and the base station, and a function (a beamformer 111 and adaptive array antennas 112) for separating users with an adaptive array.

Figure 21:
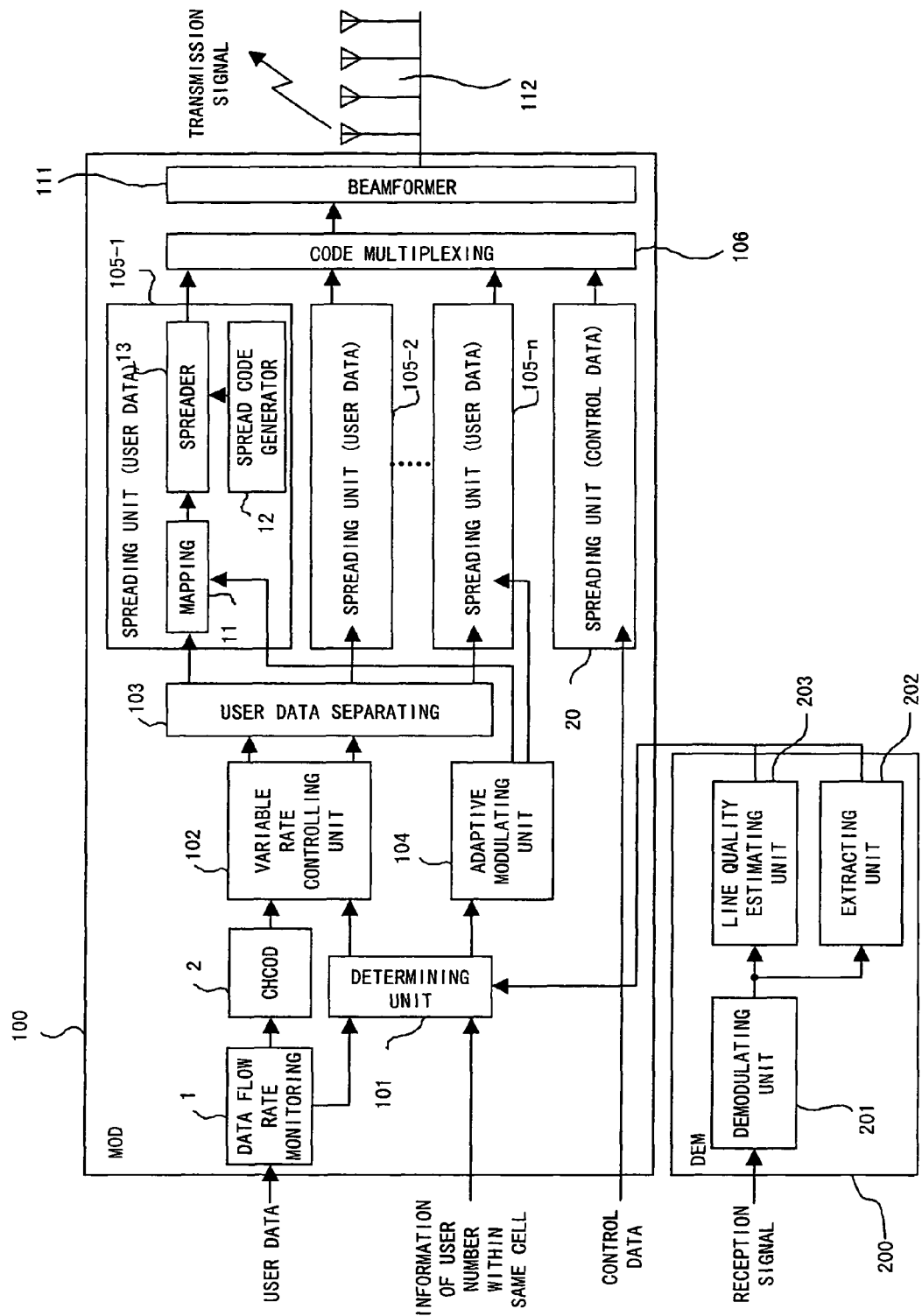
FIG. 21 is a schematic diagram showing the configuration of a base station according to a sixth embodiment of the present invention.

FIG. 21 is a schematic diagram showing the configuration of a base station according to a sixth embodiment of the present invention. The base station according to the sixth embodiment is a combination of the fourth and the third embodiments. Namely, the base station according to the sixth embodiment comprises a function (an extracting unit 202 and a channel quality estimating unit 203) for detecting the quality of a channel between a mobile station 40 and the base station, and a function (a beamformer 111 and adaptive array antennas 112) for separating users with an adaptive array.

Spread codes are finite communications resources, and must be used efficiently and fairly. Accordingly, if the number of users who request a communication within a communications area is large, code multiplexing may be restricted. For example, if a new user makes a request to start a communication in a situation where no available spread code is left, the base station may change a data transmission in code-multiplexing manner to a data transmission using one spread code. In this case, a spread code that becomes available can be allocated to the new user.

The above described embodiments refer to a data transmission from a base station to a mobile station. However, the present invention is not limited to this transmission. Namely, the present invention is also applicable to a data transmission from a mobile station to a base station. In this case, however, information about the use statuses of spread codes must be notified from the base station to the mobile station.

Additionally, in the above described embodiments, the plurality of spreading units 105-1 to 105-n are provided to make code multiplexing. However, the present invention is not limited to this configuration. Namely, one spreading unit may implement operations, which are equivalent to the spread operations performed by the plurality of spreading units 105-1 to 105-n, by repeating a spread process for user data while cyclically changing a predetermined number of spread codes.

What is claimed is:

1. A transmission control method for a radio base station which communicates with a radio mobile station by using code division multiplexing and adaptive modulation control, said transmission control method comprising:

receiving a report from the radio mobile station with respect to reception quality which is measured for radio signals transmitted from the radio base station by the radio mobile station;

setting a higher priority for an increase in a number of spread codes to be multiplexed than for a change increasing a level of a multi-level modulation of a modulation scheme; and selecting according to the priority set for a number of spread codes and a modulation scheme, and a provided constraint, a combination of a number of spread codes and a modulation scheme, transmitting information of the selected combination to the radio mobile station, and transmitting data to the radio mobile station in accordance with the selected combination, wherein when transmission using multiple spread codes and a first modulation scheme and transmission using a single spread code and a second modulation scheme that uses a larger number of signal points than the first modulation scheme are selectable, the first modulation scheme and the multiple spread codes are preferentially applied to a control channel between the radio base station and the radio mobile station regardless of determination of the modulation scheme, for data transmission, determined.

2. The transmission control method according to claim 1, wherein the second modulation scheme as the modulation scheme is selected when the multiple spread codes are not assignable to the radio mobile station.

3. The method according to claim 1, wherein the multiple spread codes with the first modulation scheme are selected for transmission of the data to the radio mobile station when the multiple codes are assignable to the radio mobile station.

4. A transmission control method in a radio transmitting device used in a CDMA communication system capable of changing and controlling an applied modulation scheme, the transmission control method comprising:
  prioritizing an increase in a number of one or more spread codes to be used higher than a change of increasing a level of a multi-level modulation to a modulation scheme having more kinds of signal points arranged on a phase plane, by increasing the number of spread codes to be used and multiplexed to two or more and not changing the applied modulation scheme when transmitting data that is transmittable without changing the modulation scheme to a radio receiving device by applying the increased number of spread codes;
  selecting according to a priority for a number of one or more spread codes and a modulation scheme, and a provided constraint, a combination of a number of one or more spread codes and a modulation scheme;
  transmitting the data to the radio receiving device, wherein
  when two or more combinations of a number of one or more spread codes and a modulation scheme are selectable under the provided constraint, the selecting selects one of the two or more selectable combinations according to the priority,
  the priority prioritizes the increase in the number of one or more spread codes higher than the change of increasing the level of the multi-level modulation, and
  when only a single combination of a number of one or more spread codes and a modulation scheme is selectable under the provided constraint, the selecting selects the single combination regardless of the priority.

5. The transmission control method according to claim 4, wherein the provided constraint includes one or more of a detected data rate and a requested data rate.

6. A transmission control method in a radio transmitting device used in a CDMA communication system capable of changing and controlling an applied modulation scheme, the transmission control method comprising:
  prioritizing an increase in a number of one or more spread codes to be used higher than a change of increasing a level of a multi-level modulation to a modulation scheme having more kinds of signal points arranged on a phase plane, by increasing the number of spread codes to be used and multiplexed to two or more and not changing the applied modulation scheme when transmitting data that is transmittable without changing the modulation scheme to a radio receiving device by applying the increased number of spread codes;
  selecting according to a priority for a number of one or more spread codes and a modulation scheme, and a provided constraint, a combination of a number of one or more spread codes and a modulation scheme;
  transmitting the data to the radio receiving device, wherein situations where the data is transmittable to the radio receiving device include:
    a first situation where transmission of the data to the radio receiving device is enabled by applying the increased number of spread codes, without changing the modulation scheme to another modulation scheme having more kinds of signal points arranged on the phase plane; and
    a second situation where transmission of the data to the radio receiving device is enabled by the change of increasing the level of the multi-level modulation, and
  when both the first situation and the second situation hold, the selecting selects a combination of the increased number of spread codes and the unchanged modulation scheme under the first situation.

7. A base station used in a CDMA communication system, the base station comprising:
  a receiver that receives, from a mobile station, data having been modulated with a selected modulation scheme and spread with selected number of one or more spread codes, wherein
  the mobile station prioritizes an increase in a number of one or more spread codes to be used higher than a change of increasing a level of a multi-level modulation to a modulation scheme having more kinds of signal points arranged on a phase plane, by increasing the number of spread codes to be used and multiplexed to two or more and not changing the applied modulation scheme when transmitting data that is transmittable without changing the modulation scheme to the base station by applying the increased number of spread codes,
  the mobile station selects according to a priority for a number of one or more spread codes and a modulation scheme, and a provided constraint, a combination of a number of one or more spread codes and a modulation scheme,
  when two or more combinations of a number of one or more spread codes and a modulation scheme are selectable under the provided constraint, the mobile station selects one of the two or more selectable combinations according to the priority,
  the priority prioritizes the increase in the number of one or more spread codes higher than the change of increasing the level of the multi-level modulation, and
  when only a single combination of a number of one or more spread codes and a modulation scheme is selectable under the provided constraint, the mobile station selects the single combination regardless of the priority.

8. A base station used in a CDMA communication system, the base station comprising:
  a receiver that receives, from a mobile station, data having been modulated with a selected modulation scheme and spread with selected number of one or more spread codes, wherein
  the mobile station prioritizes an increase in a number of one or more spread codes to be used higher than a change of increasing a level of a multi-level modulation to a modulation scheme having more kinds of signal points arranged on a phase plane, by increasing the number of spread codes to be used and multiplexed to two or more and not changing the applied modulation scheme when transmitting data that is transmittable without changing the modulation scheme to the base station by applying the increased number of spread codes,
  the mobile station selects according to a priority for a number of one or more spread codes and a modulation scheme, and a provided constraint, a combination of a number of one or more spread codes and a modulation scheme, situations where the data is transmittable by the mobile station to the base station include:

a first situation where transmission of the data to the base station is enabled by applying the increased number of spread codes, without changing the modulation scheme to another modulation scheme having more kinds of signal points arranged on the phase plane; and a second situation where transmission of the data to the base station is enabled by the change of increasing the level of the multi-level modulation, and when both the first situation and the second situation hold, the mobile station selects a combination of the increased number of spread codes and the unchanged modulation scheme under the first situation.

\* \* \* \* \*